United States Patent
Shyshkin et al.

(10) Patent No.: US 11,792,387 B2
(45) Date of Patent: Oct. 17, 2023

(54) OPTICAL CORRECTION SYSTEMS AND METHODS FOR CORRECTING NON-UNIFORMITY OF EMISSIVE DISPLAY DEVICES

(71) Applicant: Ignis Innovation Inc., Waterloo (CA)

(72) Inventors: Vyacheslav Shyshkin, Mississauga (CA); Adam Saechao, Kitchener (CA)

(73) Assignee: Ignis Innovation Inc., Road Town (VG)

(*) Notice: Subject to any disclaimer, the term of this patent is extended or adjusted under 35 U.S.C. 154(b) by 0 days.

(21) Appl. No.: 17/894,501

(22) Filed: Aug. 24, 2022

(65) Prior Publication Data
US 2023/0007236 A1    Jan. 5, 2023

Related U.S. Application Data

(63) Continuation of application No. 17/245,090, filed on Apr. 30, 2021, now Pat. No. 11,457,206, which is a continuation of application No. 15/675,095, filed on Aug. 11, 2017, now Pat. No. 11,025,899.

(51) Int. Cl.
G09G 3/00 (2006.01)
G09G 3/3225 (2016.01)
H04N 17/04 (2006.01)
G01J 1/02 (2006.01)
G01J 1/32 (2006.01)

(52) U.S. Cl.
CPC ............ *H04N 17/04* (2013.01); *G01J 1/0228* (2013.01); *G01J 1/32* (2013.01); *G09G 3/006* (2013.01); *G09G 3/3225* (2013.01); *G09G 2320/0233* (2013.01); *G09G 2320/0693* (2013.01)

(58) Field of Classification Search
CPC ............... G09G 2320/0233; G09G 2320/0693
See application file for complete search history.

(56) References Cited

U.S. PATENT DOCUMENTS 4,354,162 A  10/1982  Wright
4,758,831 A   7/1988  Kasahara et al.
4,963,860 A  10/1990  Stewart
(Continued)

FOREIGN PATENT DOCUMENTS

CA    1294034    1/1992
CA    2109951   11/1992
(Continued)

OTHER PUBLICATIONS

Ahnood et al.: "Effect of threshold voltage instability on field effect mobility in thin film transistors deduced from constant current measurements"; dated Aug. 2009 (3 pages).
(Continued)

*Primary Examiner* — Krishna P Neupane
(74) *Attorney, Agent, or Firm* — Stratford Group Ltd.

(57) ABSTRACT

What is disclosed are systems and methods of optical correction for pixel evaluation and correction for active matrix light emitting diode device (AMOLED) and other emissive displays. Optical correction for correcting for non-homogeneity of a display panel uses sparse display test patterns in conjunction with a defocused camera as the measurement device to avoid aliasing (moiré) of the pixels of the display in the captured images.

22 Claims, 4 Drawing Sheets

(56) References Cited

U.S. PATENT DOCUMENTS

| | | |
|---|---|---|
| 4,975,691 A | 12/1990 | Lee |
| 4,996,523 A | 2/1991 | Bell et al. |
| 5,051,739 A | 9/1991 | Hayashida et al. |
| 5,222,082 A | 6/1993 | Plus |
| 5,266,515 A | 11/1993 | Robb et al. |
| 5,498,880 A | 3/1996 | Lee et al. |
| 5,589,847 A | 12/1996 | Lewis |
| 5,619,033 A | 4/1997 | Weisfield |
| 5,648,276 A | 7/1997 | Hara et al. |
| 5,670,973 A | 9/1997 | Bassetti et al. |
| 5,684,365 A | 11/1997 | Tang et al. |
| 5,686,935 A | 11/1997 | Weisbrod |
| 5,712,653 A | 1/1998 | Katoh et al. |
| 5,714,968 A | 2/1998 | Ikeda |
| 5,747,928 A | 5/1998 | Shanks et al. |
| 5,748,160 A | 5/1998 | Shieh et al. |
| 5,784,042 A | 7/1998 | Ono et al. |
| 5,790,234 A | 8/1998 | Matsuyama |
| 5,815,303 A | 9/1998 | Berlin |
| 5,870,071 A | 2/1999 | Kawahata |
| 5,874,803 A | 2/1999 | Garbuzov et al. |
| 5,880,582 A | 3/1999 | Sawada |
| 5,903,248 A | 5/1999 | Irwin |
| 5,917,280 A | 6/1999 | Burrows et al. |
| 5,923,794 A | 7/1999 | McGrath et al. |
| 5,952,789 A | 9/1999 | Stewart et al. |
| 5,990,629 A | 11/1999 | Yamada et al. |
| 6,023,259 A | 2/2000 | Howard et al. |
| 6,069,365 A | 5/2000 | Chow et al. |
| 6,081,131 A | 6/2000 | Ishii |
| 6,091,203 A | 7/2000 | Kawashima et al. |
| 6,097,360 A | 8/2000 | Holloman |
| 6,144,222 A | 11/2000 | Ho |
| 6,157,583 A | 12/2000 | Starnes et al. |
| 6,166,489 A | 12/2000 | Thompson et al. |
| 6,177,915 B1 | 1/2001 | Beeteson et al. |
| 6,181,376 B1 | 1/2001 | Rashkovskiy et al. |
| 6,225,846 B1 | 5/2001 | Wada et al. |
| 6,229,508 B1 | 5/2001 | Kane |
| 6,232,939 B1 | 5/2001 | Saito et al. |
| 6,246,180 B1 | 6/2001 | Nishigaki |
| 6,252,248 B1 | 6/2001 | Sano et al. |
| 6,259,424 B1 | 7/2001 | Kurogane |
| 6,274,887 B1 | 8/2001 | Yamazaki et al. |
| 6,288,696 B1 | 9/2001 | Holloman |
| 6,300,928 B1 | 10/2001 | Kim |
| 6,303,963 B1 | 10/2001 | Ohtani et al. |
| 6,306,694 B1 | 10/2001 | Yamazaki et al. |
| 6,307,322 B1 | 10/2001 | Dawson et al. |
| 6,316,786 B1 | 11/2001 | Mueller et al. |
| 6,320,325 B1 | 11/2001 | Cok et al. |
| 6,323,631 B1 | 11/2001 | Juang |
| 6,323,832 B1 | 11/2001 | Nishizawa et al. |
| 6,345,085 B1 | 2/2002 | Yeo et al. |
| 6,348,835 B1 | 2/2002 | Sato et al. |
| 6,365,917 B1 | 4/2002 | Yamazaki |
| 6,367,037 B1 | 4/2002 | Remer et al. |
| 6,373,453 B1 | 4/2002 | Yudasaka |
| 6,384,427 B1 | 5/2002 | Yamazaki et al. |
| 6,392,617 B1 | 5/2002 | Gleason |
| 6,399,988 B1 | 6/2002 | Yamazaki |
| 6,414,661 B1 | 7/2002 | Shen et al. |
| 6,420,758 B1 | 7/2002 | Nakajima |
| 6,420,834 B2 | 7/2002 | Yamazaki et al. |
| 6,420,988 B1 | 7/2002 | Azami et al. |
| 6,433,488 B1 | 8/2002 | Bu |
| 6,445,376 B2 | 9/2002 | Parrish |
| 6,468,638 B2 | 10/2002 | Jacobsen et al. |
| 6,489,952 B1 | 12/2002 | Tanaka et al. |
| 6,501,098 B2 | 12/2002 | Yamazaki |
| 6,501,466 B1 | 12/2002 | Yamagashi et al. |
| 6,512,271 B1 | 1/2003 | Yamazaki et al. |
| 6,518,594 B1 | 2/2003 | Nakajima et al. |
| 6,524,895 B2 | 2/2003 | Yamazaki et al. |
| 6,531,713 B1 | 3/2003 | Yamazaki |
| 6,559,594 B2 | 5/2003 | Fukunaga et al. |
| 6,573,195 B1 | 6/2003 | Yamazaki et al. |
| 6,573,584 B1 | 6/2003 | Nagakari et al. |
| 6,576,926 B1 | 6/2003 | Yamazaki et al. |
| 6,577,302 B2 | 6/2003 | Hunter |
| 6,580,408 B1 | 6/2003 | Bae et al. |
| 6,580,657 B2 | 6/2003 | Sanford et al. |
| 6,583,775 B1 | 6/2003 | Sekiya et al. |
| 6,583,776 B2 | 6/2003 | Yamazaki et al. |
| 6,587,086 B1 | 7/2003 | Koyama |
| 6,593,691 B2 | 7/2003 | Nishi et al. |
| 6,594,606 B2 | 7/2003 | Everitt |
| 6,597,203 B2 | 7/2003 | Fortes |
| 6,611,108 B2 | 8/2003 | Kimura |
| 6,617,644 B1 | 9/2003 | Yamazaki et al. |
| 6,618,030 B2 | 9/2003 | Kane et al. |
| 6,641,933 B1 | 11/2003 | Yamazaki et al. |
| 6,661,180 B2 | 12/2003 | Koyama |
| 6,661,397 B2 | 12/2003 | Mikami et al. |
| 6,670,637 B2 | 12/2003 | Yamazaki et al. |
| 6,677,713 B1 | 1/2004 | Sung |
| 6,680,577 B1 | 1/2004 | Inukai et al. |
| 6,687,266 B1 | 2/2004 | Ma et al. |
| 6,690,344 B1 | 2/2004 | Takeuchi et al. |
| 6,693,388 B2 | 2/2004 | Oomura |
| 6,693,610 B2 | 2/2004 | Shannon et al. |
| 6,697,057 B2 | 2/2004 | Koyama et al. |
| 6,720,942 B2 | 4/2004 | Lee et al. |
| 6,734,636 B2 | 5/2004 | Sanford et al. |
| 6,738,034 B2 | 5/2004 | Kaneko et al. |
| 6,738,035 B1 | 5/2004 | Fan |
| 6,771,028 B1 | 8/2004 | Winters |
| 6,777,712 B2 | 8/2004 | Sanford et al. |
| 6,780,687 B2 | 8/2004 | Nakajima et al. |
| 6,806,638 B2 | 10/2004 | Lih et al. |
| 6,806,857 B2 | 10/2004 | Sempel et al. |
| 6,809,706 B2 | 10/2004 | Shimoda |
| 6,859,193 B1 | 2/2005 | Yumoto |
| 6,861,670 B1 | 3/2005 | Ohtani et al. |
| 6,873,117 B2 | 3/2005 | Ishizuka |
| 6,873,320 B2 | 3/2005 | Nakamura |
| 6,878,968 B1 | 4/2005 | Ohnuma |
| 6,909,114 B1 | 6/2005 | Yamazaki |
| 6,909,419 B2 | 6/2005 | Zavracky et al. |
| 6,919,871 B2 | 7/2005 | Kwon |
| 6,937,215 B2 | 8/2005 | Lo |
| 6,940,214 B1 | 9/2005 | Komiya et al. |
| 6,943,500 B2 | 9/2005 | LeChevalier |
| 6,954,194 B2 | 10/2005 | Matsumoto et al. |
| 6,956,547 B2 | 10/2005 | Bae et al. |
| 6,995,510 B2 | 2/2006 | Murakami et al. |
| 6,995,519 B2 | 2/2006 | Arnold et al. |
| 7,022,556 B1 | 4/2006 | Adachi |
| 7,023,408 B2 | 4/2006 | Chen et al. |
| 7,027,015 B2 | 4/2006 | Booth, Jr. et al. |
| 7,034,793 B2 | 4/2006 | Sekiya et al. |
| 7,088,051 B1 | 8/2006 | Cok |
| 7,106,285 B2 | 9/2006 | Naugler |
| 7,116,058 B2 | 10/2006 | Lo et al. |
| 7,129,914 B2 | 10/2006 | Knapp et al. |
| 7,129,917 B2 | 10/2006 | Yamazaki et al. |
| 7,141,821 B1 | 11/2006 | Yamazaki et al. |
| 7,161,566 B2 | 1/2007 | Cok et al. |
| 7,193,589 B2 | 3/2007 | Yoshida et al. |
| 7,199,516 B2 | 4/2007 | Seo et al. |
| 7,220,997 B2 | 5/2007 | Nakata |
| 7,235,810 B1 | 6/2007 | Yamazaki et al. |
| 7,245,277 B2 | 7/2007 | Ishizuka |
| 7,248,236 B2 | 7/2007 | Nathan et al. |
| 7,264,979 B2 | 9/2007 | Yamagata et al. |
| 7,274,345 B2 | 9/2007 | Imamura et al. |
| 7,274,363 B2 | 9/2007 | Ishizuka et al. |
| 7,279,711 B1 | 10/2007 | Yamazaki et al. |
| 7,304,621 B2 | 12/2007 | Oomori et al. |
| 7,310,092 B2 | 12/2007 | Imamura |
| 7,315,295 B2 | 1/2008 | Kimura |
| 7,317,429 B2 | 1/2008 | Shirasaki et al. |
| 7,319,465 B2 | 1/2008 | Mikami et al. |
| 7,321,348 B2 | 1/2008 | Cok et al. |

(56) References Cited

U.S. PATENT DOCUMENTS

| | | |
|---|---|---|
| 7,339,636 B2 | 3/2008 | Voloschenko et al. |
| 7,355,574 B1 | 4/2008 | Leon et al. |
| 7,358,941 B2 | 4/2008 | Ono et al. |
| 7,402,467 B1 | 7/2008 | Kadono et al. |
| 7,414,600 B2 | 8/2008 | Nathan et al. |
| 7,432,885 B2 | 10/2008 | Asano et al. |
| 7,474,285 B2 | 1/2009 | Kimura |
| 7,485,478 B2 | 2/2009 | Yamagata et al. |
| 7,502,000 B2 | 3/2009 | Yuki et al. |
| 7,535,449 B2 | 5/2009 | Miyazawa |
| 7,554,512 B2 | 6/2009 | Steer |
| 7,569,849 B2 | 8/2009 | Nathan et al. |
| 7,619,594 B2 | 11/2009 | Hu |
| 7,619,597 B2 | 11/2009 | Nathan et al. |
| 7,697,052 B1 | 4/2010 | Yamazaki et al. |
| 7,825,419 B2 | 11/2010 | Yamagata et al. |
| 7,859,492 B2 | 12/2010 | Kohno |
| 7,868,859 B2 | 1/2011 | Tomida et al. |
| 7,876,294 B2 | 1/2011 | Sasaki et al. |
| 7,948,170 B2 | 5/2011 | Striakhilev et al. |
| 7,969,390 B2 | 6/2011 | Yoshida |
| 7,995,010 B2 | 8/2011 | Yamazaki et al. |
| 8,044,893 B2 | 10/2011 | Nathan et al. |
| 8,115,707 B2 | 2/2012 | Nathan et al. |
| 8,378,362 B2 | 2/2013 | Heo et al. |
| 8,493,295 B2 | 7/2013 | Yamazaki et al. |
| 8,497,525 B2 | 7/2013 | Yamagata et al. |
| 10,038,884 B2 | 7/2018 | Holub |
| 2001/0002703 A1 | 6/2001 | Koyama |
| 2001/0004190 A1 | 6/2001 | Nishi et al. |
| 2001/0013806 A1 | 8/2001 | Notani |
| 2001/0015653 A1 | 8/2001 | De Jong et al. |
| 2001/0020926 A1 | 9/2001 | Kujik |
| 2001/0024186 A1 | 9/2001 | Kane |
| 2001/0026127 A1 | 10/2001 | Yoneda et al. |
| 2001/0026179 A1 | 10/2001 | Saeki |
| 2001/0026257 A1 | 10/2001 | Kimura |
| 2001/0030323 A1 | 10/2001 | Ikeda |
| 2001/0033199 A1 | 10/2001 | Aoki |
| 2001/0038098 A1 | 11/2001 | Yamazaki et al. |
| 2001/0043173 A1 | 11/2001 | Troutman |
| 2001/0045929 A1 | 11/2001 | Prache et al. |
| 2001/0052606 A1 | 12/2001 | Serrpel et al. |
| 2001/0052898 A1 | 12/2001 | Osame et al. |
| 2002/0000576 A1 | 1/2002 | Inukai |
| 2002/0011796 A1 | 1/2002 | Koyama |
| 2002/0011799 A1 | 1/2002 | Kimura |
| 2002/0011981 A1 | 1/2002 | Kujik |
| 2002/0015031 A1 | 2/2002 | Fujita et al. |
| 2002/0015032 A1 | 2/2002 | Koyama et al. |
| 2002/0030528 A1 | 3/2002 | Matsumoto et al. |
| 2002/0030647 A1 | 3/2002 | Hack et al. |
| 2002/0036463 A1 | 3/2002 | Yoneda et al. |
| 2002/0047852 A1 | 4/2002 | Inukai et al. |
| 2002/0048829 A1 | 4/2002 | Yamazaki et al. |
| 2002/0050795 A1 | 5/2002 | Imura |
| 2002/0053401 A1 | 5/2002 | Ishikawa et al. |
| 2002/0070909 A1 | 6/2002 | Asano et al. |
| 2002/0080108 A1 | 6/2002 | Wang |
| 2002/0084463 A1 | 7/2002 | Sanford et al. |
| 2002/0101172 A1 | 8/2002 | Bu |
| 2002/0101433 A1 | 8/2002 | McKnight |
| 2002/0113248 A1 | 8/2002 | Yamagata et al. |
| 2002/0122308 A1 | 9/2002 | Ikeda |
| 2002/0130686 A1 | 9/2002 | Forbes |
| 2002/0154084 A1 | 10/2002 | Tanaka et al. |
| 2002/0158823 A1 | 10/2002 | Zavracky et al. |
| 2002/0163314 A1 | 11/2002 | Yamazaki et al. |
| 2002/0167471 A1 | 11/2002 | Everitt |
| 2002/0180369 A1 | 12/2002 | Koyama |
| 2002/0180721 A1 | 12/2002 | Kimura et al. |
| 2002/0186214 A1 | 12/2002 | Siwinski |
| 2002/0190332 A1 | 12/2002 | Lee et al. |
| 2002/0190924 A1 | 12/2002 | Asano et al. |
| 2002/0190971 A1 | 12/2002 | Nakamura et al. |
| 2002/0195967 A1 | 12/2002 | Kim et al. |
| 2002/0195968 A1 | 12/2002 | Sanford et al. |
| 2003/0020413 A1 | 1/2003 | Oomura |
| 2003/0030603 A1 | 2/2003 | Shimoda |
| 2003/0062524 A1 | 4/2003 | Kimura |
| 2003/0063081 A1 | 4/2003 | Kimura et al. |
| 2003/0071804 A1 | 4/2003 | Yamazaki et al. |
| 2003/0071821 A1 | 4/2003 | Sundahl |
| 2003/0076048 A1 | 4/2003 | Rutherford |
| 2003/0090445 A1 | 5/2003 | Chen et al. |
| 2003/0090447 A1 | 5/2003 | Kimura |
| 2003/0090481 A1 | 5/2003 | Kimura |
| 2003/0095087 A1 | 5/2003 | Libsch |
| 2003/0107560 A1 | 6/2003 | Yumoto et al. |
| 2003/0111966 A1 | 6/2003 | Mikami et al. |
| 2003/0122745 A1 | 7/2003 | Miyazawa |
| 2003/0140958 A1 | 7/2003 | Yang et al. |
| 2003/0151569 A1 | 8/2003 | Lee et al. |
| 2003/0169219 A1 | 9/2003 | LeChevalier |
| 2003/0174152 A1 | 9/2003 | Noguchi |
| 2003/0178617 A1 | 9/2003 | Appenzeller et al. |
| 2003/0179626 A1 | 9/2003 | Sanford et al. |
| 2003/0197663 A1 | 10/2003 | Lee et al. |
| 2003/0206060 A1 | 11/2003 | Suzuki |
| 2003/0230980 A1 | 12/2003 | Forrest et al. |
| 2004/0027063 A1 | 2/2004 | Nishikawa |
| 2004/0056604 A1 | 3/2004 | Shih et al. |
| 2004/0066357 A1 | 4/2004 | Kawasaki |
| 2004/0070557 A1 | 4/2004 | Asano et al. |
| 2004/0080262 A1 | 4/2004 | Park et al. |
| 2004/0080470 A1 | 4/2004 | Yamazaki et al. |
| 2004/0090400 A1 | 5/2004 | Yoo |
| 2004/0108518 A1 | 6/2004 | Jo |
| 2004/0113903 A1 | 6/2004 | Mikami et al. |
| 2004/0129933 A1 | 7/2004 | Nathan et al. |
| 2004/0130516 A1 | 7/2004 | Nathan et al. |
| 2004/0135749 A1 | 7/2004 | Kondakov et al. |
| 2004/0145547 A1 | 7/2004 | Oh |
| 2004/0150592 A1 | 8/2004 | Mizukoshi et al. |
| 2004/0150594 A1 | 8/2004 | Koyama et al. |
| 2004/0150595 A1 | 8/2004 | Kasai |
| 2004/0155841 A1 | 8/2004 | Kasai |
| 2004/0174347 A1 | 9/2004 | Sun et al. |
| 2004/0174349 A1 | 9/2004 | Libsch |
| 2004/0183759 A1 | 9/2004 | Stevenson et al. |
| 2004/0189627 A1 | 9/2004 | Shirasaki et al. |
| 2004/0196275 A1 | 10/2004 | Hattori |
| 2004/0201554 A1 | 10/2004 | Satoh |
| 2004/0207615 A1 | 10/2004 | Yumoto |
| 2004/0233125 A1 | 11/2004 | Tanghe et al. |
| 2004/0239596 A1 | 12/2004 | Ono et al. |
| 2004/0252089 A1 | 12/2004 | Ono et al. |
| 2004/0257355 A1 | 12/2004 | Naugler |
| 2004/0263437 A1 | 12/2004 | Hattori |
| 2005/0007357 A1 | 1/2005 | Yamashita et al. |
| 2005/0030267 A1 | 2/2005 | Tanghe et al. |
| 2005/0035709 A1 | 2/2005 | Furuie et al. |
| 2005/0067970 A1 | 3/2005 | Libsch et al. |
| 2005/0067971 A1 | 3/2005 | Kane |
| 2005/0068270 A1 | 3/2005 | Awakura |
| 2005/0088085 A1 | 4/2005 | Nishikawa et al. |
| 2005/0088103 A1 | 4/2005 | Kageyama et al. |
| 2005/0110420 A1 | 5/2005 | Arnold et al. |
| 2005/0117096 A1 | 6/2005 | Voloschenko et al. |
| 2005/0140598 A1 | 6/2005 | Kim et al. |
| 2005/0140610 A1 | 6/2005 | Smith et al. |
| 2005/0145891 A1 | 7/2005 | Abe |
| 2005/0156831 A1 | 7/2005 | Yamazaki et al. |
| 2005/0168416 A1 | 8/2005 | Hashimoto et al. |
| 2005/0206590 A1 | 9/2005 | Sasaki et al. |
| 2005/0225686 A1 | 10/2005 | Brummack et al. |
| 2005/0260777 A1 | 11/2005 | Brabec et al. |
| 2005/0269959 A1 | 12/2005 | Uchino et al. |
| 2005/0269960 A1 | 12/2005 | Ono et al. |
| 2005/0285822 A1 | 12/2005 | Reddy et al. |
| 2005/0285825 A1 | 12/2005 | Eom et al. |
| 2006/0007072 A1 | 1/2006 | Choi et al. |
| 2006/0012310 A1 | 1/2006 | Chen et al. |
| 2006/0027807 A1 | 2/2006 | Nathan et al. |

(56) References Cited

U.S. PATENT DOCUMENTS

| | | |
|---|---|---|
| 2006/0030084 A1 | 2/2006 | Young |
| 2006/0038758 A1 | 2/2006 | Routley et al. |
| 2006/0044227 A1 | 3/2006 | Hadcock |
| 2006/0066527 A1 | 3/2006 | Chou |
| 2006/0092185 A1 | 5/2006 | Jo et al. |
| 2006/0232522 A1 | 10/2006 | Roy et al. |
| 2006/0261841 A1 | 11/2006 | Fish |
| 2006/0264143 A1 | 11/2006 | Lee et al. |
| 2006/0273997 A1 | 12/2006 | Nathan et al. |
| 2006/0284801 A1 | 12/2006 | Yoon et al. |
| 2007/0001937 A1 | 1/2007 | Park et al. |
| 2007/0001939 A1 | 1/2007 | Hashimoto et al. |
| 2007/0008268 A1 | 1/2007 | Park et al. |
| 2007/0008297 A1 | 1/2007 | Bassetti |
| 2007/0046195 A1 | 3/2007 | Chin et al. |
| 2007/0069998 A1 | 3/2007 | Naugler et al. |
| 2007/0080905 A1 | 4/2007 | Takahara |
| 2007/0080906 A1 | 4/2007 | Tanabe |
| 2007/0080908 A1 | 4/2007 | Nathan et al. |
| 2007/0080918 A1 | 4/2007 | Kawachi et al. |
| 2007/0103419 A1 | 5/2007 | Uchino et al. |
| 2007/0182671 A1 | 8/2007 | Nathan et al. |
| 2007/0273294 A1 | 11/2007 | Nagayama |
| 2007/0285359 A1 | 12/2007 | Ono |
| 2007/0296672 A1 | 12/2007 | Kim et al. |
| 2008/0042948 A1 | 2/2008 | Yamashita et al. |
| 2008/0055209 A1 | 3/2008 | Cok |
| 2008/0074413 A1 | 3/2008 | Ogura |
| 2008/0088549 A1 | 4/2008 | Nathan et al. |
| 2008/0122803 A1 | 5/2008 | Izadi et al. |
| 2008/0230118 A1 | 9/2008 | Nakatani et al. |
| 2009/0032807 A1 | 2/2009 | Shinohara et al. |
| 2009/0051283 A1 | 2/2009 | Cok et al. |
| 2009/0160743 A1 | 6/2009 | Tomida et al. |
| 2009/0162961 A1 | 6/2009 | Deane |
| 2009/0174628 A1 | 7/2009 | Wang et al. |
| 2009/0213046 A1 | 8/2009 | Nam |
| 2009/0327994 A1 | 12/2009 | Christensen et al. |
| 2010/0052524 A1 | 3/2010 | Kinoshita |
| 2010/0078230 A1 | 4/2010 | Rosenblatt et al. |
| 2010/0079711 A1 | 4/2010 | Tanaka |
| 2010/0097335 A1 | 4/2010 | Jung et al. |
| 2010/0133994 A1 | 6/2010 | Song et al. |
| 2010/0134456 A1 | 6/2010 | Oyamada |
| 2010/0140600 A1 | 6/2010 | Clough et al. |
| 2010/0156279 A1 | 6/2010 | Tamura et al. |
| 2010/0237374 A1 | 9/2010 | Chu et al. |
| 2010/0328294 A1 | 12/2010 | Sasaki et al. |
| 2011/0090210 A1 | 4/2011 | Sasaki et al. |
| 2011/0133636 A1 | 6/2011 | Matsuo et al. |
| 2011/0180825 A1 | 7/2011 | Lee et al. |
| 2012/0212468 A1 | 8/2012 | Govil |
| 2013/0009930 A1 | 1/2013 | Cho et al. |
| 2013/0032831 A1 | 2/2013 | Chaji et al. |
| 2013/0113785 A1 | 5/2013 | Sumi |
| 2013/0147860 A1* | 6/2013 | Ishida ............... G09G 5/10 345/690 |
| 2014/0300756 A1* | 10/2014 | Murase ............ H04N 9/3194 348/189 |
| 2015/0146017 A1* | 5/2015 | Kim ............. H04N 21/4318 348/189 |
| 2015/0194105 A1* | 7/2015 | Han .................. G09G 3/3648 345/89 |
| 2015/0256823 A1* | 9/2015 | De Paepe ............ G09G 3/36 348/177 |
| 2016/0267838 A1 | 9/2016 | Zhang et al. |
| 2016/0284258 A1* | 9/2016 | Brunner ............. G09G 3/006 |
| 2020/0058248 A1* | 2/2020 | Ha .................... G09G 5/003 |

FOREIGN PATENT DOCUMENTS

| | | |
|---|---|---|
| CA | 2 249 592 | 7/1998 |
| CA | 2 368 386 | 9/1999 |
| CA | 2 242 720 | 1/2000 |
| CA | 2 354 018 | 6/2000 |
| CA | 2 436 451 | 8/2002 |
| CA | 2 438 577 | 8/2002 |
| CA | 2 483 645 | 12/2003 |
| CA | 2 463 653 | 1/2004 |
| CA | 2498136 | 3/2004 |
| CA | 2522396 | 11/2004 |
| CA | 2443206 | 3/2005 |
| CA | 2472671 | 12/2005 |
| CA | 2567076 | 1/2006 |
| CA | 2526782 | 4/2006 |
| CN | 1381032 | 11/2002 |
| CN | 1448908 | 10/2003 |
| CN | 1776922 | 5/2006 |
| DE | 20 2006 005427 | 6/2006 |
| EP | 0 940 796 | 9/1999 |
| EP | 1 028 471 A | 8/2000 |
| EP | 1 103 947 | 5/2001 |
| EP | 1 130 565 A1 | 9/2001 |
| EP | 1 184 833 | 3/2002 |
| EP | 1 194 013 | 4/2002 |
| EP | 1 310 939 | 5/2003 |
| EP | 1 335 430 A1 | 8/2003 |
| EP | 1 372 136 | 12/2003 |
| EP | 1 381 019 | 1/2004 |
| EP | 1 418 566 | 5/2004 |
| EP | 1 429 312 A | 6/2004 |
| EP | 1 439 520 | 7/2004 |
| EP | 1 465 143 A | 10/2004 |
| EP | 1 467 408 | 10/2004 |
| EP | 1 517 290 | 3/2005 |
| EP | 1 521 203 A2 | 4/2005 |
| EP | 2317499 | 5/2011 |
| GB | 2 205 431 | 12/1988 |
| JP | 09 090405 | 4/1997 |
| JP | 10-153759 | 6/1998 |
| JP | 10-254410 | 9/1998 |
| JP | 11 231805 | 8/1999 |
| JP | 11-282419 | 10/1999 |
| JP | 2000-056847 | 2/2000 |
| JP | 2000-077192 | 3/2000 |
| JP | 2000-089198 | 3/2000 |
| JP | 2000-352941 | 12/2000 |
| JP | 2002-91376 | 3/2002 |
| JP | 2002-268576 | 9/2002 |
| JP | 2002-278513 | 9/2002 |
| JP | 2002-333862 | 11/2002 |
| JP | 2003-022035 | 1/2003 |
| JP | 2003-076331 | 3/2003 |
| JP | 2003-150082 | 5/2003 |
| JP | 2003-177709 | 6/2003 |
| JP | 2003-271095 | 9/2003 |
| JP | 2003-308046 | 10/2003 |
| JP | 2005-057217 | 3/2005 |
| JP | 2006065148 | 3/2006 |
| JP | 2009282158 | 12/2009 |
| TW | 485337 | 5/2002 |
| TW | 502233 | 9/2002 |
| TW | 538650 | 6/2003 |
| TW | 569173 | 1/2004 |
| WO | WO 94/25954 | 11/1994 |
| WO | WO 99/48079 | 9/1999 |
| WO | WO 01/27910 A1 | 4/2001 |
| WO | WO 02/067327 A | 8/2002 |
| WO | WO 03/034389 A | 4/2003 |
| WO | WO 03/063124 | 7/2003 |
| WO | WO 03/077231 | 9/2003 |
| WO | WO 03/105117 | 12/2003 |
| WO | WO 2004/003877 | 1/2004 |
| WO | WO 2004/034364 | 4/2004 |
| WO | WO 2005/022498 | 3/2005 |
| WO | WO 2005/029455 | 3/2005 |
| WO | WO 2005/055185 | 6/2005 |
| WO | WO 2006/053424 | 5/2006 |
| WO | WO 2006/063448 A | 6/2006 |
| WO | WO 2006/137337 | 12/2006 |

(56) References Cited

FOREIGN PATENT DOCUMENTS

| WO | WO 2007/003877 A | 1/2007 |
|---|---|---|
| WO | WO 2007/079572 | 7/2007 |
| WO | WO 2010/023270 | 3/2010 |

OTHER PUBLICATIONS

Alexander et al.: "Pixel circuits and drive schemes for glass and elastic AMOLED displays"; dated Jul. 2005 (9 pages).
Alexander et al.: "Unique Electrical Measurement Technology for Compensation, Inspection, and Process Diagnostics of AMOLED HDTV"; dated May 2010 (4 pages).
Ashtiani et al.: "AMOLED Pixel Circuit With Electronic Compensation of Luminance Degradation"; dated Mar. 2007 (4 pages).
Chaji et al.: "A Current-Mode Comparator for Digital Calibration of Amorphous Silicon AMOLED Displays"; dated Jul. 2008 (5 pages).
Chaji et al.: "A fast settling current driver based on the CCII for AMOLED displays"; dated Dec. 2009 (6 pages).
Chaji et al.: "A Low-Cost Stable Amorphous Silicon AMOLED Display with Full V~T- and V~O~L~E~D Shift Compensation"; dated May 2007 (4 pages).
Chaji et al.: "A low-power driving scheme for a-Si:H active-matrix organic light-emitting diode displays"; dated Jun. 2005 (4 pages).
Chaji et al.: "A low-power high-performance digital circuit for deep submicron technologies"; dated Jun. 2005 (4 pages).
Chaji et al.: "A novel a-Si:H AMOLED pixel circuit based on short-term stress stability of a-Si:H TFTs"; dated Oct. 2005 (3 pages).
Chaji et al.: "A NoVel Driving Scheme and Pixel Circuit for AMOLED Displays"; dated Jun. 2006 (4 pages).
Chaji et al.: "A novel driving scheme for high-resolution large-area a-Si:H AMOLED displays"; dated Aug. 2005 (4 pages).
Chaji et al.: "A Stable Voltage-Programmed Pixel Circuit for a-Si:H AMOLED Displays"; dated Dec. 2006 (12 pages).
Chaji et al.: "A Sub-µA fast-settling current-programmed pixel circuit for AMOLED displays", dated Sep. 2007.
Chaji et al.: "An Enhanced and Simplified Optical Feedback Pixel Circuit for AMOLED Displays"; dated Oct. 2006.
Chaji et al.: "Compensation technique fo r DC and transient instability of thin film transistor circuits for large-area devices"; dated Aug. 2008.
Chaji et al.: "Driving scheme for stable operation of 2-TFT a-Si AMOLED pixel"; dated Apr. 2005 (2 pages).
Chaji et al.: "Dynamic-effect compensating technique for stable a-Si:H AMOLED displays"; dated Aug. 2005 (4 pages).
Chaji et al.: "Electrical Compensation of OLED Luminance Degradation"; dated Dec. 2007 (3 pages).
Chaji et al.: "eUTDSP: a design study of a new VLIW-based DSP architecture"; dated May 2003 (4 pages).
Chaji et al.: "Fast and Offset-Leakage Insensitive Current-Mode Line Driver for Active Matrix Displays and Sensors"; dated Feb. 2009 (8 pages).
Chaji et al.: "High Speed Low Power Adder Design With a New Logic Style: Pseudo Dynamic Logic (SDL)"; dated Oct. 2001 (4 pages).
Chaji et al.: "High-precision, fast current source for large-area current-programmed a-Si flat panels"; dated Sep. 2006 (4 pages).
Chaji et al.: "Low-Cost AMOLED Television with IGNIS Compensating Technology"; dated May 2008 (4 pages).
Chaji et al.: "Low-Cost Stable a-Si:H AMOLED Display for Portable Applications"; dated Jun. 2006 (4 pages).
Chaji et al.: "Low-Power Low-Cost Voltage-Programmed a-Si:H AMOLED Display"; dated Jun. 2008 (5 pages).
Chaji et al.: "Merged phototransistor pixel with enhanced near infrared response and flicker noise reduction for biomolecular imaging"; dated Nov. 2008 (3 pages).
Chaji et al.: "Parallel Addressing Scheme for Voltage-Programmed Active-Matrix OLED Displays"; dated May 2007 (6 pages).

Chaji et al.: "Pseudo dynamic logic (SDL): a high-speed and low-power dynamic logic family"; dated 2002 (4 pages).
Chaji et al.: "Stable a-Si:H circuits based on short-term stress stability of amorphous silicon thin film transistors"; dated May 2006 (4 pages).
Chaji et al.: "Stable Pixel Circuit for Small-Area High- Resolution a-Si:H AMOLED Displays"; dated Oct. 2008 (6 pages).
Chaji et al.: "Stable RGBW AMOLED display with OLED degradation Compensation using electrical feedback"; dated Feb. 2010 (2 pages).
Chaji et al.: "Thin-Film Transistor Integration for Biomedical Imaging and AMOLED Displays"; dated 2008 (177 pages).
European Search Report and Written Opinion for Application No. 08 86 5338 dated Nov. 2, 2011 (7 pages).
European Search Report for European Application No. EP 04 78 6661 dated Mar. 9, 2009.
European Search Report for European Application No. EP 05 75 9141 dated Oct. 30, 2009.
European Search Report for European Application No. EP 05 82 1114 dated Mar. 27, 2009 (2 pages).
European Search Report for European Application No. EP 07 71 9579 dated May 20, 2009 .
European Search Report dated Mar. 26, 2012 in corresponding European Patent Apphcation No. 10000421.7 (6pages).
Extended European Search Report dated Apr. 27, 2011 issued during prosecution of European patent application No. 09733076.5 (13 pages).
Goh et al., "A New a-Si:H Thin Film transistor Pixel Circul for Active-Matrix Organic Light-Emitting Diodes", IEEE Electron Device Letters, vol. 24, No. 9, Sep. 2003, 4 pages.
International Search Report for International Application No. PCT/CA02/00180 dated Jul. 31, 2002 (3 pages).
International Search Report for International Application No. PCT/CA2004/001741 dated Feb. 21, 2005.
International Search Report for International Application No. PCT/CA2005/001844 dated Mar. 28, 2006 (2 pages).
International Search Report for International Application No. PCT/CA2005/001007 dated Oct. 18, 2005.
International Search Report for International Application No. PCT/CA2007/000652 dated Jul. 25, 2007.
International Search Report for International Application No. PCT/CA2008/002307, dated Apr. 28. 2009 (3 pages).
International Search Report for International Apphcation No. PCT/IB2011/055135, Canadian Patent Office, dated Apr. 16, 2012 (5 pages).
International Search Report dated Jul. 30, 2009 for International Application No. PCT/CA2009/000501 (4 pages).
Jafarabadiashtiani et al.: "A New Driving Method for a-Si AMOLED Display's Based on Voltage Feedback"; dated 2005 (4 pages).
Lee et al.: "Ambipolar Thin-Film Transistors Fabricated by PECVD Nanocrystalline Silicon"; dated 2006 (6 pages).
Ma e y et al: "Organic Light-EmittingDiode/Thin Film Transistor Integration for foldable Displays" Conference record of the 1997 International display research conference and international workshops on LCD technology and emissive technology. Toronto, Sep. 15-19, 1997 (6 pages).
Matsueda y et al.: "35.1: 2.5-in. AMOLED with Integrated 6-bit Gamma Compensated Digital Data Driver"; dated May 2004.
Nathan et al.: "Backplane Requirements for Active Matrix Organic Light Emitting Diode Displays"; dated 2006 (16 pages).
Nathan et al.: "Call for papers second international workshop on compact thin-film transistor (TFT) modeling for circuit simulation"; dated Sep. 2009 (1 page).
Nathan et al.: "Driving schemes for a-Si and LTPS AMOLED displays"; dated Dec. 2005 (11 pages).
Nathan et al.: "Invited Paper: a -Si for AMOLED—Meeting the Performance and Cost Demands of Display Applications (Cell Phone to HDTV)"; dated 2006 (4pages).
Nathan et al.: "Thin film imaging technology on glass and plastic" ICM 2000, Proceedings of the 12$^{th}$ International Conference on Microelectronics, (IEEE Cat. No. 00EX453), Tehran Iran; dated Oct. 31-Nov. 2, 2000, pp. 11-14, ISBN: 964-360-057-2, p. 13, col. 1, line 11-48; (4 pages).

(56) References Cited

OTHER PUBLICATIONS

Nathan et al., "Amorphous Silicon Thin Film Transistor Circuit Integration for Organic LED Displays on Glass and Plastic", IEEE Journal of Solid-State Circuits, vol. 39, No. 9, Sep. 2004, pp. 1477-1486.
Office Action issued in Chinese Patent Application 200910246264.4 dated Jul. 5, 2013; 8 pages.
Patent Abstracts of Japan, vol. 2000, No. 09, Oct. 13, 2000—JP 2000 172199 A, Jun. 3, 2000, abstract.
Patent Abstracts of Japan, vol. 2002, No. 03, Apr. 3, 2002 (Apr. 4, 2004 & JP 2001 318627 A (Semiconductor EnergyLab Do Ltd), Nov. 16, 2001, abstract, paragraphs '01331-01801, paragraph '01691, paragraph '01701, paragraph '01721 and figure 10.
Philipp: "Charge transfer sensing" Sensor Review, vol. 19, No. 2, Dec. 31, 1999 (Dec. 31, 1999), 10 pages.
Rafati et al.: "Comparison of a 17 b multiplier in Dual-rail domino and in Dual-rail D L (D L) logic styles"; dated 2002 (4 pages).
Safavaian et al.: "Three-TFT image sensor for real-time digital X-ray imaging"; dated Feb. 2, 2006 (2 pages).
Safavian et al.: "3-TFT active pixel sensor with correlated double sampling readout circuit for real-time medical x-ray imaging"; dated Jun. 2006 (4 pages).
Safavian et al.: "A novel current Scaling active pixel sensor with correlated double sampling readout circuit for real time medical x-ray imaging"; dated May 2007 (7 pages).
Safavian et al.: "A novel hybrid active-passive pixel with correlated double sampling CMOS readout circuit for medical x-ray imaging"; dated May 2008 (4 pages).
Safavian et al.: "Self-compensated a-Si:H detector with current-mode readout circuit for digital X-ray fluoroscopy"; dated Aug. 2005 (4 pages).
Safavian et al.: "TFT active image sensor with current-mode readout circuit for digital x-ray fluoroscopy [5969D-82]"; dated Sep. 2005 (9 pages).
Sanford, James L., et al., "4.2 TFT AMOLED Pixel Circuits and Driving Methods", SID 03 Digest, ISSN/0003, 2003, pp. 10-13.
Stewart M. et al., "Polysilicon TFT technology for active matrix OLED displays" IEEE transactions on electron devices, vol. 48, No. 5; Dated May 2001 (7 pages).
Tatsuya Sasaoka et al., 24.4L; Late-News Paper: A 13.0-inch AM-Oled Display with Top Emitting Structure and Adaptive CurrentMode Programmed Pixel Circuit (Tac); SID 01 Digest, (2001), pp. 384-387.
Vygranenko et al.: "Stability of indium-oxide thin-film transistors by reactive ion beam assisted deposition"; dated 2009.
Wang et al.: "Indium oxides by reactive ion beam assisted evaporation: From material study to device application"; dated Mar. 2009 (6 pages).
Written Opinion dated Jul. 30, 2009 for International Application No. PCT/CA2009/000501 (6 pages).
Yi He et al., "Current-Source a-Si:H Thin Film Transistor Circuit for Active-Matrix Organic Light-Emitting Displays", IEEE Electron Device Letters, vol. 21, No. 12, Dec. 2000, pp. 590-592.
Zhiguo Meng et al; "24.3: Active-Matrix Organic Light-Emitting Diode Display implemented Using Metal-Induced Unilaterally Crystallized Poly crystalline Silicon Thin-Film Transistors", SID 01Digest, (2001), pp. 380-383.
International Search Report for Application No. PCT/IB2014/059409, Canadian Intellectual Property Office, dated Jun. 12, 2014 (4 pages).
Written Opinion for Application No. PCT/IB2014/059409, Canadian Intellectual Property' Office, dated Jun. 12, 2014 (5 pages).
Extended European Search Report for Application No. EP 14181848.4, dated Mar. 5, 2015, (9 pages)
Building Compilable Class Models, David S. Frankel, 2001 (28 pages).
Sosnoski, D. "Classworking toolkit: Combining source and bytecode generation", developerWorks, http://www.ibm.com/developerworks/java/libraiy/j-cwtl 0045/index.html, Oct. 4, 2005 (9 pages).
First Page of Office Action issued on corresponding Chinese Patent Application No. 201810910187.7, dated Feb. 14, 2022.

\* cited by examiner

OPTICAL CORRECTION SYSTEMS AND METHODS FOR CORRECTING NON-UNIFORMITY OF EMISSIVE DISPLAY DEVICES

CROSS REFERENCE TO RELATED APPLICATIONS

This application is a continuation of U.S. patent application Ser. No. 17/245,090, filed Apr. 30, 2021, now allowed, which is a continuation of U.S. patent application Ser. No. 15/675,095, filed Aug. 11, 2017, now U.S. Pat. No. 11,025,899, which are hereby incorporated by reference in their entireties.

FIELD OF THE INVENTION

The present disclosure relates to optically measuring and calibrating light emissive visual display technology, and particularly to optical correction systems and methods for individual pixel luminance evaluation and correction for active matrix organic light emitting diode device (AMO-LED) and other emissive displays.

BRIEF SUMMARY

According to a first aspect there is provided an optical correction method for correcting for non-uniformity of an emissive display panel having pixels, each pixel having a light-emitting device, the method comprising: arranging a camera in front of the display panel; defocusing the camera such that the focal point of the camera lies outside of a plane passing through the light-emitting devices of the display panel, the defocusing such that individual pixels of the display panel are blurred in images of the display panel captured by the camera; displaying a plurality of test patterns while capturing respective images of said test patterns displayed, said captured images for use as luminance measurement data for pixels of the display panel, each of said displayed test patterns comprising a set of activated pixels spaced apart such that in each captured image, at least one portion of each blurred image of each activated pixel does not overlap with a blurred image of another activated pixel; and determining from said luminance measurement data, correction data for correcting non-uniformity of images displayed in the display panel.

In some embodiments, the amount of blurring in images of the display panel captured by the camera is sufficient to avoid aliasing in the captured images of the display panel.

In some embodiments, a resolution of the camera is less than twice a resolution of the display panel. In some embodiments, said activated pixels of each displayed test pattern are arranged in a diamond or rectangular lattice.

In some embodiments, said activated pixels of the plurality of displayed test patterns comprise regular test pixels, each of said regular test pixels of said plurality of displayed test patterns having a greyscale luminance value selected from a set of at least two predetermined greyscale luminance values. In some embodiments, the set of at least two predetermined greyscale luminance values includes a relatively low greyscale luminance value and a relatively high greyscale luminance value.

In some embodiments, said activated pixels of the plurality of the displayed test patterns comprise multilevel pixels, each of said multilevel pixels of said plurality of displayed test patterns having a greyscale luminance value greater or less than one of the greyscale luminance values of the set of at least two predetermined greyscale luminance values by a relatively small greyscale luminance value.

Some embodiments further provide for determining correction data for each pixel of the display panel with use of a first luminance measurement of that pixel when displaying a first greyscale luminance value of the set of at least two predetermined greyscale luminance values and a second luminance measurement of that pixel when displaying a second greyscale luminance value of the set of at least two predetermined greyscale luminance values, and with use of a scale factor for that pixel determined with use of luminance measurements of pixels throughout the display panel when displaying the multilevel pixels of the displayed test patterns.

In some embodiments, said activated pixels of the plurality of the displayed test patterns comprise calibration pixels, the embodiment further providing for determining locations of the activated pixels of the displayed test patterns as they appear in the captured images of the displayed test patterns; and determining at least one point spread function exhibited by blurred images of activated pixels of the displayed test pattern in the captured images, in which the activated pixels of the plurality of displayed test patterns are spaced apart such that in the captured images, blurred images of each calibration pixel does not overlap with blurred images of any other activated pixel.

In some embodiments, each of the luminance measurements of each of the regular test pixels and each of the multilevel pixels is performed with use of an acquisition kernel determined from at least one of a spacing of the activated pixels of the displayed test patterns and the at least one point spread function.

In some embodiments, the relatively low greyscale luminance value is substantially 10 percent of the maximum possible greyscale luminance value, and the relatively high greyscale luminance value is substantially 80 percent of the maximum greyscale luminance value. In some embodiments, the relatively small greyscale luminance value is one of substantially 1 percent of the maximum possible greyscale luminance value and the smallest incremental digital value of possible greyscale luminance values.

In some embodiments, all of said regular test pixels of the relatively low greyscale luminance value are displayed in a first set of sparse flat test patterns, wherein all of said regular test pixels of the relatively high greyscale luminance value are displayed in a second set of sparse flat test patterns, wherein all of said multilevel pixels having a greyscale luminance value greater or less than the relatively low greyscale luminance value are displayed in a first set of multilevel patterns, and wherein all of said multilevel pixels having a greyscale luminance value greater or less than the relatively high greyscale luminance value are displayed in a second set of multilevel patterns.

Some embodiments further provide for correcting image data with use of the correction data prior to driving the pixels to display an image corresponding to the image data.

According to a second aspect there is provided an optical correction system for correcting non-uniformity of an emissive display having pixels, each pixel having a light-emitting device, the system comprising: a camera arranged in front of the display for capturing images of a plurality of test patterns displayed on the display, the camera defocused such that the focal point of the camera lies outside of a plane passing through the light-emitting devices of the display and such that individual pixels of the display are blurred in images of the display captured by the camera, each of said displayed test patterns comprising a set of activated pixels spaced apart such that in each captured image, at least one portion of each blurred image of each activated pixel does not overlap with a blurred image of another activated pixel; optical correction processing coupled to the camera and for receiving from the camera captured images of said test patterns displayed on the display, said captured images for use as luminance measurement data for pixels of the display; determining from said luminance measurement data, correction data for correcting non-uniformity of images displayed in the display; and transmitting the correction data to the display for storage in a memory of the display.

In some embodiments, the optical correction processing is further for determining correction data for each pixel of the display with use of a first luminance measurement of that pixel when displaying a first greyscale luminance value of the set of at least two predetermined greyscale luminance values and a second luminance measurement of that pixel when displaying a second greyscale luminance value of the set of at least two predetermined greyscale luminance values, and with use of a scale factor for that pixel determined with use of luminance measurements of pixels throughout the display when displaying the multilevel pixels of the displayed test patterns.

In some embodiments, said activated pixels of the plurality of the displayed test patterns comprise calibration pixels, and wherein the optical correction processing is further for determining locations of the activated pixels of the displayed test patterns as they appear in the captured images of the displayed test patterns; and determining at least one point spread function exhibited by blurred images of activated pixels of the displayed test pattern in the captured images, wherein the activated pixels of the plurality of displayed test patterns are spaced apart such that in the captured images, blurred images of each calibration pixel does not overlap with blurred images of any other activated pixel.

In some embodiments, each of the luminance measurements of each of the regular test pixels and each of the multilevel pixels is performed by the optical correction processing with use of an acquisition kernel determined from at least one of a spacing of the activated pixels of the displayed test patterns and the at least one point spread function.

Some embodiments, further provide for a controller of the emissive display system coupled to said optical correction processing, said controller for receiving image data for display by the display; receiving from the optical correction processing the correction data; and correcting the image data with use of the correction data prior to driving the pixels to display an image corresponding to the image data.

The foregoing and additional aspects and embodiments of the present disclosure will be apparent to those of ordinary skill in the art in view of the detailed description of various embodiments and/or aspects, which is made with reference to the drawings, a brief description of which is provided next.

BRIEF DESCRIPTION OF THE DRAWINGS

The foregoing and other advantages of the disclosure will become apparent upon reading the following detailed description and upon reference to the drawings.

While the present disclosure is susceptible to various modifications and alternative forms, specific embodiments or implementations have been shown by way of example in the drawings and will be described in detail herein. It should be understood, however, that the disclosure is not intended to be limited to the particular forms disclosed. Rather, the disclosure is to cover all modifications, equivalents, and alternatives falling within the spirit and scope of an invention as defined by the appended claims.

DETAILED DESCRIPTION

Many modern display technologies suffer from defects, variations, and non-uniformities, from the moment of fabrication, and can suffer further from aging and deterioration over the operational lifetime of the display, which result in the production of images which deviate from those which are intended. Optical correction systems and methods can be used, either during fabrication or after a display has been put into use, to measure and correct pixels (and sub-pixels) whose output luminance varies from the expected luminance. AMOLED panels in particular are characterized by luminance non-uniformity.

To correct for this intrinsic non-uniformity of the display, the incoming video signal is deliberately modified with compensation data or correction data such that it compensates for the non-uniformity. In some approaches, to obtain the correction data the luminance of each individual panel pixel is measured for a range of greyscale luminance values, and correction values for each pixel are determined. A typical setup utilizes a monochrome or conventional RGB still picture camera as the measurement device. At least one calibration pattern is displayed on the display and captured with the camera. Measurements in the form of captured images are then processed to extract the actual luminance of each individual pixel of the display. Taking into account the greyscale luminance value of the pixel of the calibration pattern which was used to drive the pixel of the display, a correction signal for that pixel of the display driven at that greyscale luminance value is generated. Limitations with this technique arise when the spatial sampling rate of the camera falls below two times the spatial frequency of the pixel image of the display. According to well-known sampling principles, the camera should operate at or above the Nyquist rate, i.e. at or above twice the frequency of the pixel image of the display, in order to reconstruct the displayed image accurately from a single captured image taken by the camera. When the sampling rate of the camera falls below twice the image pixel rate of the display, the reconstructed image will suffer from aliasing (moiré) and pixel overlap, i.e. images of different pixels of the display will overlap in images taken by the camera. As displays are produced with increasingly higher and higher resolutions this poses a problem for obtaining correction data with existing standard resolution cameras which do not have resolutions as high as twice that of the display, and alternatively increases costs by necessitating deployment of optical correction systems which include much higher resolution cameras.

While the embodiments described herein will be in the context of AMOLED displays it should be understood that the optical correction systems and methods described herein are applicable to any other display comprising pixels, including but not limited to light emitting diode displays (LED), electroluminescent displays (ELD), organic light emitting diode displays (OLED), plasma display panels (PSP), microLED or quantum dot displays, among other displays.

It should be understood that the embodiments described herein pertain to systems and methods of optical correction and compensation and do not limit the display technology underlying their operation and the operation of the displays in which they are implemented. The systems and methods described herein are applicable to any number of various types and implementations of various visual display technologies.

Figure 1:
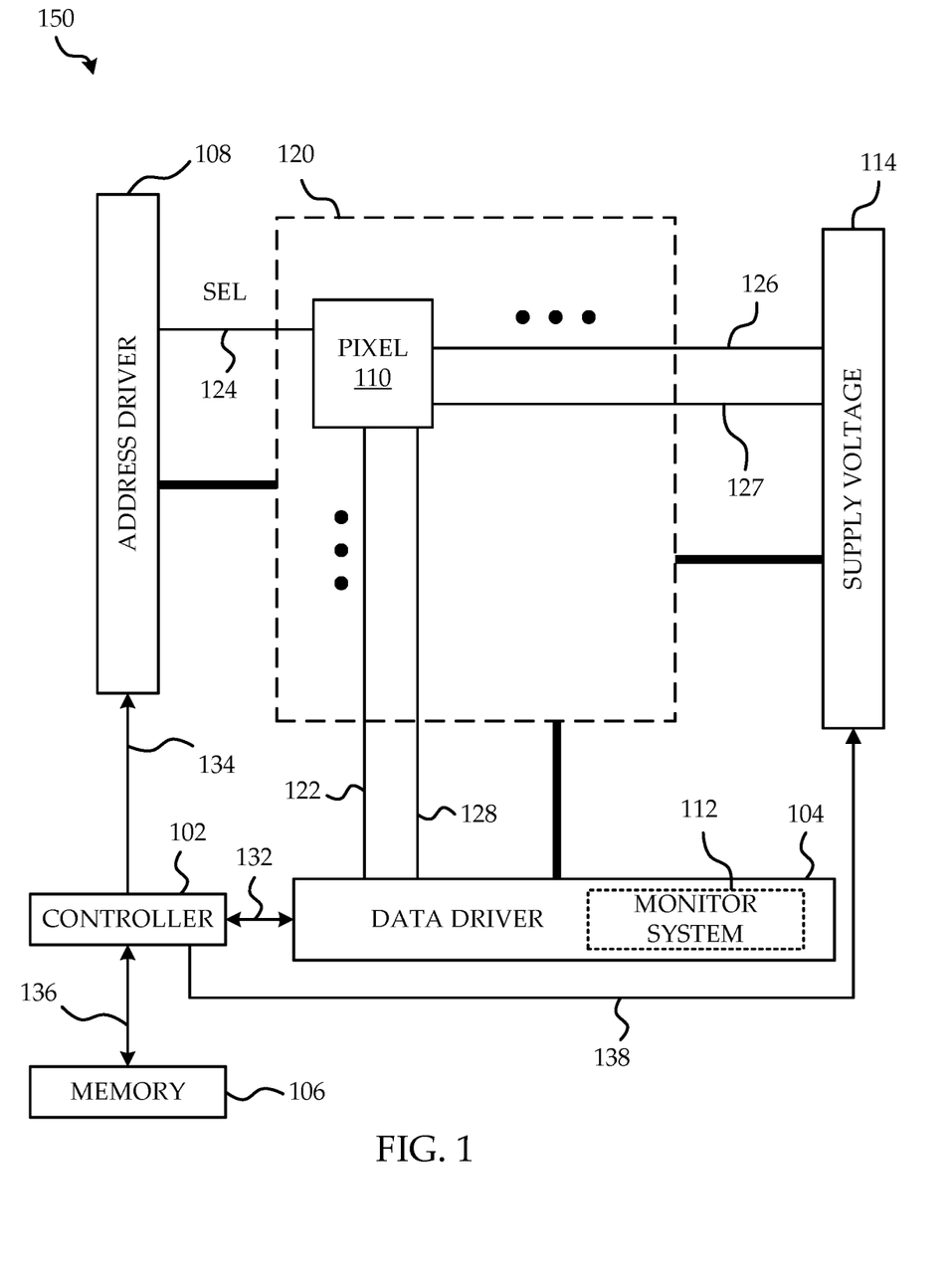
FIG. 1 illustrates an example display system which participates in and whose pixels are to be measured and corrected by the optical correction systems and methods disclosed.

FIG. 1 is a diagram of an example display system 150 implementing the methods described further below in conjunction with an arrangement with a camera and optical correction processing. The display system 150 includes a display panel 120, an address driver 108, a data driver 104, a controller 102, and a memory storage 106.

The display panel 120 includes an array of pixels 110 (only one explicitly shown) arranged in rows and columns. Each of the pixels 110 is individually programmable to emit light with individually programmable luminance values. The controller 102 receives digital data indicative of information to be displayed on the display panel 120. The controller 102 sends signals 132 to the data driver 104 and scheduling signals 134 to the address driver 108 to drive the pixels 110 in the display panel 120 to display the information indicated. The plurality of pixels 110 of the display panel 120 thus comprise a display array or display screen adapted to dynamically display information according to the input digital data received by the controller 102. The display screen and various subsets of its pixels define "display areas" which may be used for monitoring and managing display brightness. The display screen can display images and streams of video information from data received by the controller 102. The supply voltage 114 provides a constant power voltage or can serve as an adjustable voltage supply that is controlled by signals from the controller 102. The display system 150 can also incorporate features from a current source or sink (not shown) to provide biasing currents to the pixels 110 in the display panel 120 to thereby decrease programming time for the pixels 110.

For illustrative purposes, only one pixel 110 is explicitly shown in the display system 150 in FIG. 1. It is understood that the display system 150 is implemented with a display screen that includes an array of a plurality of pixels, such as the pixel 110, and that the display screen is not limited to a particular number of rows and columns of pixels. For example, the display system 150 can be implemented with a display screen with a number of rows and columns of pixels commonly available in displays for mobile devices, monitor-based devices, and/or projection-devices. In a multichannel or color display, a number of different types of pixels, each responsible for reproducing color of a particular channel or color such as red, green, or blue, will be present in the display. Pixels of this kind may also be referred to as "subpixels" as a group of them collectively provide a desired color at a particular row and column of the display, which group of subpixels may collectively also be referred to as a "pixel".

The pixel 110 is operated by a driving circuit or pixel circuit that generally includes a driving transistor and a light emitting device. Hereinafter the pixel 110 may refer to the pixel circuit. The light emitting device can optionally be an organic light emitting diode, but implementations of the present disclosure apply to pixel circuits having other electroluminescence devices, including current-driven light emitting devices and those listed above. The driving transistor in the pixel 110 can optionally be an n-type or p-type amorphous silicon thin-film transistor, but implementations of the present disclosure are not limited to pixel circuits having a particular polarity of transistor or only to pixel circuits having thin-film transistors. The pixel circuit 110 can also include a storage capacitor for storing programming information and allowing the pixel circuit 110 to drive the light emitting device after being addressed. Thus, the display panel 120 can be an active matrix display array.

As illustrated in FIG. 1, the pixel 110 illustrated as the top-left pixel in the display panel 120 is coupled to a select line 124, a supply line 126, a data line 122, and a monitor line 128. A read line may also be included for controlling connections to the monitor line. In one implementation, the supply voltage 114 can also provide a second supply line to the pixel 110. For example, each pixel can be coupled to a first supply line 126 charged with Vdd and a second supply line 127 coupled with Vss, and the pixel circuits 110 can be situated between the first and second supply lines to facilitate driving current between the two supply lines during an emission phase of the pixel circuit. It is to be understood that each of the pixels 110 in the pixel array of the display 120 is coupled to appropriate select lines, supply lines, data lines, and monitor lines. It is noted that aspects of the present disclosure apply to pixels having additional connections, such as connections to additional select lines, and to pixels having fewer connections.

With reference to the pixel 110 of the display panel 120, the select line 124 is provided by the address driver 108, and can be utilized to enable, for example, a programming operation of the pixel 110 by activating a switch or transistor to allow the data line 122 to program the pixel 110. The data line 122 conveys programming information from the data driver 104 to the pixel 110. For example, the data line 122 can be utilized to apply a programming voltage or a programming current to the pixel 110 in order to program the pixel 110 to emit a desired amount of luminance. The programming voltage (or programming current) supplied by the data driver 104 via the data line 122 is a voltage (or current) appropriate to cause the pixel 110 to emit light with a desired amount of luminance according to the digital data received by the controller 102. The programming voltage (or programming current) can be applied to the pixel 110 during a programming operation of the pixel 110 so as to charge a storage device within the pixel 110, such as a storage capacitor, thereby enabling the pixel 110 to emit light with the desired amount of luminance during an emission operation following the programming operation. For example, the storage device in the pixel 110 can be charged during a programming operation to apply a voltage to one or more of a gate or a source terminal of the driving transistor during the emission operation, thereby causing the driving transistor to convey the driving current through the light emitting device according to the voltage stored on the storage device.

Generally, in the pixel 110, the driving current that is conveyed through the light emitting device by the driving transistor during the emission operation of the pixel 110 is a current that is supplied by the first supply line 126 and is drained to a second supply line 127. The first supply line 126 and the second supply line 127 are coupled to the voltage supply 114. The first supply line 126 can provide a positive supply voltage (e.g., the voltage commonly referred to in circuit design as "Vdd") and the second supply line 127 can provide a negative supply voltage (e.g., the voltage commonly referred to in circuit design as "Vss"). Implementations of the present disclosure can be realized where one or the other of the supply lines (e.g., the supply line 127) is fixed at a ground voltage or at another reference voltage.

The display system 150 also includes a monitoring system 112. With reference again to the pixel 110 of the display panel 120, the monitor line 128 connects the pixel 110 to the monitoring system 112. The monitoring system 12 can be integrated with the data driver 104, or can be a separate stand-alone system. In particular, the monitoring system 112 can optionally be implemented by monitoring the current and/or voltage of the data line 122 during a monitoring operation of the pixel 110, and the monitor line 128 can be entirely omitted. The monitor line 128 allows the monitoring system 112 to measure a current or voltage associated with the pixel 110 and thereby extract information indicative of a degradation or aging of the pixel 110 or indicative of a temperature of the pixel 110. In some embodiments, display panel 120 includes temperature sensing circuitry devoted to sensing temperature implemented in the pixels 110, while in other embodiments, the pixels 110 comprise circuitry which participates in both sensing temperature and driving the pixels. For example, the monitoring system 112 can extract, via the monitor line 128, a current flowing through the driving transistor within the pixel 110 and thereby determine, based on the measured current and based on the voltages applied to the driving transistor during the measurement, a threshold voltage of the driving transistor or a shift thereof.

The controller and 102 and memory store 106 together or in combination with a compensation block (not shown) use compensation data or correction data, in order to address and correct for the various defects, variations, and non-uniformities, existing at the time of fabrication, and optionally, defects suffered further from aging and deterioration after usage. In some embodiments, the correction data includes data for correcting the luminance of the pixels obtained through measurement and processing using an external optical feedback system such as that described below. Some embodiments employ the monitoring system 112 to characterize the behavior of the pixels and to continue to monitor aging and deterioration as the display ages and to update the correction data to compensate for said aging and deterioration over time.

For the embodiments disclosed herein, correction data is directly determined during an optical correction operation either during or subsequent to fabrication or after the display has been in operation for some time, from observing the luminance of each pixel and determining the correction data to produce luminance of an acceptable level.

Figure 2:
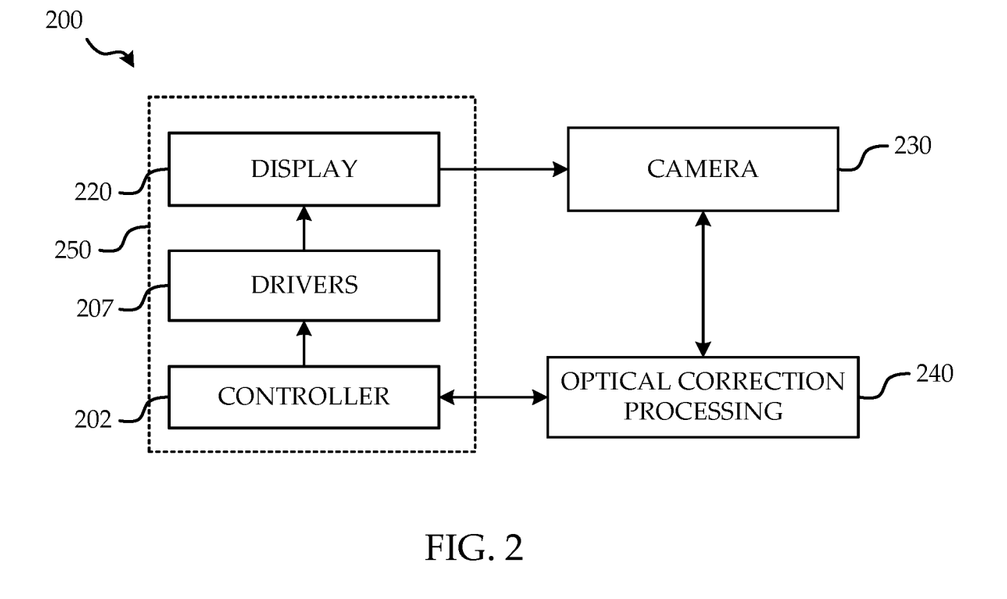
FIG. 2 is a system block diagram of an optical correction system.

Referring to FIG. 2, an optical correction system 200 according to an embodiment will now be described.

The optical correction system 200 includes display system 250 which is to be corrected, a camera 230, a controller 202 for overall control the process, which in the embodiment of FIG. 2 is shown as part of the display system 250, and an optical correction processing module 240 for controlling specific processes of the optical correction methods. The optical correction processing 240 can be part of an external tool that is used for example in a production factory for correction of the displays. In another case, optical correction processing 240 can be part of the display system and/or the controller, for example, integrated in a timing controller TCON. The display system 250 of FIG. 2 may correspond more or less to the display system 150 of FIG. 1 and includes similar components thereof, of which specifically, drivers 207, the display panel 220, and the controller 202 are shown explicitly for convenience. The controller 202 may correspond to controller 102 or controller 102 and memory 106 of FIG. 1.

The camera 230 is arranged to measure the luminance of all of the pixels 110 of the display panel 220. The camera 230 may be based on a digital photography system with lenses, and may be a monochromatic digital camera or a standard digital camera, such as a monochromatic or RGB, CCD CMOS or other sensor array based camera, or any other suitable optical measurement technology capable of taking optical images through a lens and generating a luminance measurement image representative of the optical output of the display panel 220. Optical correction processing 240 receives the luminance measurement image data from the camera 230. Luminance measurement image data refers to any matrix containing optical luminance data corresponding to the output of the display panel 220, and may comprise multiple channels such as red (R), green (G), blue (B) etc. and in some cases may be monochromatic as in the case where the camera 230 is monochromatic. Hereinafter, luminance measurement image data will be referred to simply as a "captured image" and if monochromatic, will be assumed to include one luminance value for every pixel of the captured image. It should be understood that any reference made to "greyscale luminance value" is a reference to the DAC (Digital to Analogue Converter) signal data value used to drive a pixel and which results in a pixel producing an actual luminance. For simplicity, the preset luminance values associated with the various pixel patterns described below are characterized in terms of the corresponding DAC signal i.e. greyscale luminance value which is used to drive the pixels. Advantages of using a monochromatic camera versus an RGB camera include faster exposure times, avoidance of display and sensor R, G, B frequency mismatch and/or crosstalk, avoidance of mismatching numbers or arrangements of the R, G, B sub-pixels of the display and the R, G, B elements of the sensor array, and ease of handing yellow or white subpixels of display panel 220. In some embodiments utilizing either a monochromatic or an RGB camera, measurements of each pixel of the display occurs only for a single channel or subpixel color (R, G, B, Y, or W etc.) at any one time.

For the embodiments herein described, the resolution of the camera 230 and equally a ratio of the resolution of the camera 230 to the resolution of the display panel 220, are not required to exceed the thresholds otherwise required according to the Nyquist rate. This is because the camera is intentionally defocused and test patterns incorporate activated pixels whose blurred images have portions which do not overlap with one another, as described below. In particular, the resolution of the camera 230 need not be greater than twice the resolution of the display panel 220. The camera 230 may be operated manually or automatically controlled by one or both of the controller 202 and optical correction processing 240.

Figure 3:
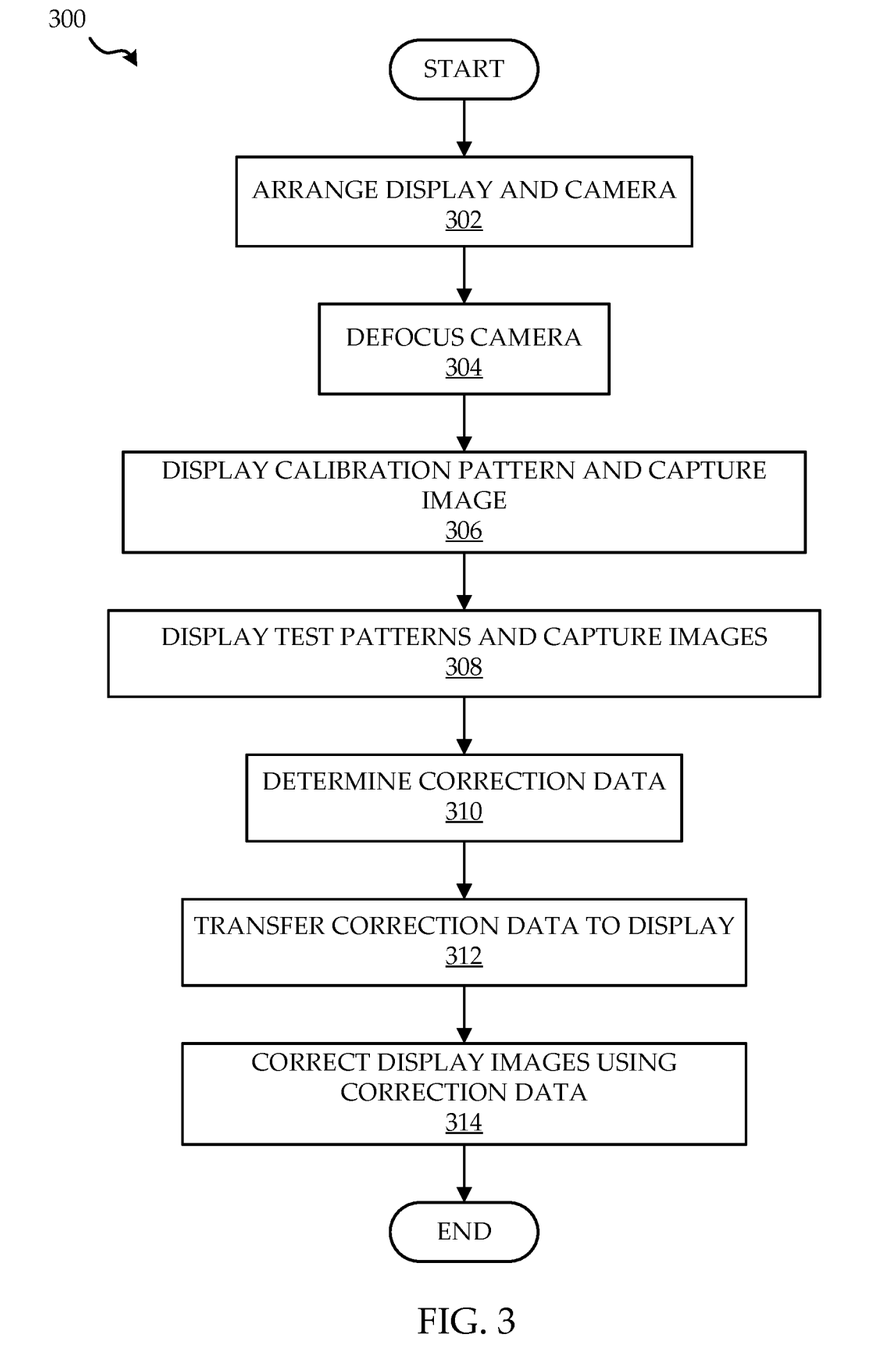
FIG. 3 is a high level functional block diagram of an optical correction method.

With reference also to the optical correction method 300 of FIG. 3, camera 230 and the display panel 220 are arranged 302 such that the entirety of the viewable area of the display panel 220 appears within the field of view of the camera 230. In some embodiments, the camera 230 is positioned in front of display panel 220, aimed at the center of the viewable area of the display panel 220 and with the viewable area of the display panel 220 maximized to occupy as much of the field of view of the camera 230 as possible. The line of sight of the camera 230 (controlled by camera pan, tilt, and positioning) may be such that it is parallel and coincident with a normal to the plane of the front surface of the display panel 220 emerging at the center of the display panel 220 to reduce distortions and to ensure any remaining distortions are as symmetrical as possible in the resulting images of the display panel 220. Calibration pattern processing discussed below, however, can compensate for deviations in the relative placement and alignment of the camera 230 and the display panel 220.

Once the camera 230 and the display panel 220 have been arranged 302 relative to each other, the camera 230 is intentionally defocused 304. The defocusing of the camera 230 results in the focal point of the camera being positioned either in front of or behind a plane passing through the light emitting elements of the pixels 110 of the display panel 220. The amount of defocusing is set such that it is sufficient, in the context of the particular display panel 220 and camera 230, to avoid aliasing (moiré). This amount of defocusing generally depends upon a number of factors, primarily upon the ratio of the resolution of the camera 230 to the resolution of the display panel 220, but also upon the number and arrangement of subpixels per pixel 110 in the display panel 220, the number and arrangement of optical sensors (CCD, CMOS, etc.), the presence of color/bayer and/or antialiasing filters in the camera 230, and any effects caused by the optics of the front surface layers of the display panel 220, etc. The level of defocusing will vary from case to case, but generally the amount of defocusing which is sufficient to avoid aliasing (moiré) is directly determined through empirical testing. In some embodiments the minimum amount of defocusing to completely remove aliasing is chosen.

Instead of displaying all pixels of the display panel 220 simultaneously according to known techniques, in combination with intentional defocusing, the present embodiments display a number of display test patterns, each of which includes a sparse set of activated pixels which are spaced apart far enough so that at least some portion of the blurred images of each of the activated pixels in the captured images do not overlap or interfere with each other. Typically this portion would include (but is not limited to) the center of each blurred image of the activated pixels, and in some cases this non-overlapping portion would constitute a majority of each blurred image of an activated pixel, in which case, only the outer portions or edges of the blurred images of the pixels would overlap. In some embodiments, and for some test patterns, the blurred images of the activated pixels in the captured images do not have any overlap with each other. Combining the defocusing with appropriately spaced apart activated pixels simultaneously avoids aliasing (moiré) while accommodating use of a camera 220 with a resolution well below the Nyquist limit to measure individual pixel luminances. Moreover, by avoiding overlap for at least some portion of each image of each pixel, the highest frequency mura may be characterized i.e. accurate measurements of the luminance on an individual pixel basis is possible. As described below, even in embodiments with some overlap of the blurred images of the individual pixels, as long as the overlap is controlled, accurate measurements of the luminance of each individual pixel may be made with appropriately chosen acquisition kernals which avoid or processes areas of overlap with appropriate weights.

In embodiments where the amount of defocusing is chosen to be as small as possible while still avoiding aliasing (moiré), smaller point spread images of the activated pixels are created, allowing for a more streamlined process by involving fewer test patterns each of which requires smaller spaces between activated pixels to avoid overlap. In some embodiments, only individual channels (R, G, B, Y, W etc) of each activated pixel are activated at any one time.

Once the camera has been defocused 304 a calibration pattern is displayed on the display panel 230 and an image is captured 306 by the camera 220. In some embodiments, the calibration pattern includes a sparse set of single pixels activated differently from a flat background. Preferably, in some embodiments, the spacing of the sparse set of single activated pixels of the calibration pattern is such that the images of those pixels in images taken by the camera 230 do not have any overlap. In some embodiments the activated pixels are set at a discernably bright greyscale and the flat background is black. In some embodiments, only individual channels (e.g. R, G, or B) of any activated pixel are activated at any one time. In some embodiments, the activated pixels are arranged in a spaced rectilinear array or a rectangular lattice. In such embodiments the activated pixels are located at corners of an imaginary grid which would result from imaginary lines drawn through the rows and columns of activated pixels and is also known as a dot grid. Other regular lattices include triangular, and diamond pattern lattices. Any sparse set of activated pixels of sufficient spacing may be used whether arranged in a regular or irregular lattice. The calibration pattern is utilized to establish the location of the individual pixels on the display panel 220 in the captured images which are captured by the camera 230. The activated pixels in the calibration pattern are chosen such that the subpixel layout of the panel is sufficiently captured. The center of the activated pixels are then located within the captured image and an nth polynomial approximation is then performed, to calculate the location of every subpixel on the panel in the image. The distribution and pattern of the locations of the pixels of the calibration pattern as they appear in the captured image which is captured by the camera 230 (hereinafter the "calibration image") allows correction of any geometrical distortion, such as rotation, tilt and skew, in subsequent images of the display panel 220 taken by the camera 230. The calibration image also samples the point spread function (PSF) caused by the defocusing and corresponding to the blurring of pixels located in each area of the image of the display panel 220. Although the PSF may be substantially homogeneous across the captured images taken of the display panel 220, often due to many factors, including the structure of the lens system of the camera 230, the PSF may be non-uniform throughout various areas of the captured images of the display panel 220. In the case of a calibration pattern of sparse individual pixels, the point spread function is substantially directly observable in the image captured by the camera 230. In some embodiments more than one calibration pattern is utilized. In some embodiments, no separate calibration pattern is used, and instead, one or more of the test patterns discussed below serve the same functions as the calibration pattern and in other embodiments "calibration pixels" are included within the series of display test patterns and serve the same function as the calibration pattern. The point spread function may be utilized in display panel 220 pixel luminance determination as discussed below.

In some embodiments, the number, size, and arrangement of the sub-pixels will be such that it is preferable to limit each activated pixel of the calibration pattern to a single channel R, G, B, etc. This ensures any slight difference between sub-pixel locations of R, G, B, and any slight differences in the PSFs for each channel R, G, B, etc. will accurately be associated with each measurement separately. The calibration pattern or patterns should have enough red, green, and blue calibration pixels to adequately characterize the display panel 220 in accordance with the foregoing.

Once the calibration pattern has been displayed and captured 306, a series of display test patterns is displayed by the display panel 220 and images are captured by the camera 230. Each test pattern of the series of display test patterns include pixels having non-zero greyscale luminance spaced apart far enough so that some portion of each image of each pixel of the pattern displayed on the display panel 220 as it appears in the captured images, which are blurred according to the PSF, do not interfere or overlap with images of the other pixels of the pattern. As described above, intentional defocusing of the camera 230 is such that images of each illuminated pixel of the display panel 220 appears as a spread out blurred image of that pixel according to the PSF and problems due to aliasing (moiré) are avoided. In some embodiments, the activated pixels of the display test patterns are arranged in a spaced rectilinear array or a rectangular lattice. In such embodiments the activated pixels are located at corners of an imaginary grid which would result from imaginary lines drawn through the rows and columns of activated pixels and is also known as a dot grid. Other regular lattices include triangular, and diamond pattern lattices. Any sparse set of activated pixels of sufficient spacing may be used whether arranged in a regular or irregular lattice.

The series of display test patterns are such that each pixel 110 of the display panel 220 may be corrected with correction data based on measurements in the form of the captured images by the camera 230 of the display panel 220 displaying the display test patterns. Preferably, the resolution of the display test pattern is the same as the resolution of the display panel 220.

In some embodiments, the series of display test patterns are such that each pixel of the display panel 220 is activated at more than one level of greyscale luminance. In some embodiments, this is done separately for each channel R, G, B, etc. In some embodiments, the series of display test patterns include, for every pixel, at least one pattern having that pixel activated at a fixed first greyscale luminance value P1 and at least one other pattern having that pixel activated at a fixed second greyscale luminance value P2. The first and second fixed greyscale luminance values P1, P2 used to activate the pixel are generally chosen based on what levels of greyscale are desired to exhibit the greatest uniformity. In some embodiments, the series of display test patterns include, for every pixel, at least one pattern having that pixel activated at a fixed relatively low greyscale luminance value P1 (for example 10 percent of the possible maximum greyscale luminance value) and at least one other pattern having that pixel activated at a fixed relatively high greyscale luminance value P2 (for example 80 percent of the possible maximum greyscale luminance value). Over the series of display test patterns, every single pixel is programmed at least once with each of P1 and P2 and corresponding resulting luminances of the pixel caused by programming the pixel with P1 and P2 are determined from the images of that pixel in those captured images of the display panel 220 displaying those display test patterns with that pixel at values P1 and P2. Pixels of the display test patterns having values P1 or P2 are referred to hereinafter as "regular test pixels".

The number of display test patterns and the levels of the illuminated pixels therein depends upon the technique used to correct the data used to program each pixel. The example embodiments which follow correct the display panel non-uniformity by determining the DAC (Digital to Analogue Converter) signal which corrects the luminance non-uniformity of the panel by determining information about the DAC signal to luminance scale factor. The scale factor, once determined is used to scale the DAC correction signal to the luminance non-uniformity so that the correction applied corrects for the non-uniformity. This scale factor is obtained by also including in the series of test patterns, a subset of pixels (for example ⅓ or ¼ of the total number of pixels of the display panel 220) throughout the display test patterns such that the pixel is activated with greyscale luminance values near P1 and P2, i.e. at a DAC signal level of P1 or P2 changed by some small Δ (+Δ or −Δ). In some embodiments, Δ is a small percentage of the maximum greyscale luminance level (such as 1%), and in other embodiments, Δ is on the order of the smallest incremental digital value in the DAC signal. In some embodiments, this is done separately for each channel R, G, B, etc. The difference between the luminance produced by the pixels of the display panel 220 displaying a value of P1 (or P2) and the luminance produced by the pixels of the display panel 220 displaying a value of P1+Δ or −Δ (or P2+Δ or −Δ) allows extraction of the scale factor between the DAC signal and measured luminance at P1 (or P2) and therefore can be used to translate luminance non-uniformity into a correction signal. In some embodiments, the series of display test patterns includes pixels of greyscale luminance levels including both +Δ and −Δ about values P1 and P2. In some embodiments, instead of small positive and negative changes symmetrically about the midpoint PX, the small positive change +delta and the small negative change are −Delta not identical in magnitude. In some embodiments, the multilevel pixels about P1 are not at the same locations as the multilevel pixels about P2. In some embodiments the multilevel pixels include multilevel sample greyscale luminances of more than two levels for each PX.

The subset of pixels of the display test patterns is chosen to be less than the total number of pixels of the display panel 220 because the scale factor does not deviate greatly pixel to pixel and generally exhibits localized uniformity but exhibits global non-uniformity over the entire display panel 220. Although multilevel data for only those display panel pixels which display the subset of pixels (hereinafter "multilevel pixels") of the display test patterns is extracted, the scale factors corresponding to P1 and P2 for all pixels may be estimated with use of an interpolation algorithm, such as bilinear interpolation for a rectilinear subset, or any other method appropriate for the particular arrangement of the subset of pixels. In some embodiments the measured luminances are interpolated first, and scale factors for all pixels are determined from those values, while in other embodiments the scale factors are determined first for some pixels and then interpolated for all pixels.

To correct the panel within the set of all possible input DAC, P1 and P2 should be chosen to be far apart, and value P1 should be chosen low enough to approximate properly panel non-uniformity for all possible DAC values. In other embodiments, regular test pixels include pixels at N levels, P1, . . . , PN, and the multilevel pixels include pixels at 2N levels, namely, at P1+Δ, P1−Δ, . . . , PN+Δ, PN−Δ.

Once all of the display test patterns have been displayed and captured 308, correction data is determined 310 from a processing by the optical correction processing 240 of all of the images taken by the camera 230. The calibration image or images taken by the camera of the calibration pattern or patterns are processed. As described above, the calibration image is processed to establish the location of individual pixels on the display panel 220 and to correct for any geometrical distortion such as rotation, tilt, and skew. For calibration patterns with sparse activated pixels whose images in the calibration image do not overlap, the PSFs of various regions of the display panel 220 are directly observable from the images of the blurred activated pixels and may be substantially directly extracted from the calibration image. Generally, data forming a mapping of display panel 220 pixel locations to image pixel locations in images captured by the camera 230 are produced along with data which allow the extraction of an estimate of the PSF for every pixel of the display panel 220.

Once the calibration image is processed, the captured images of the display test patterns displayed by the display panel 220 are processed. Using the known location within the captured image of each pixel of the display panel 220, and using the expected PSF in the area of the known location, a luminance of each pixel of the display panel 220 is extracted. In some embodiments, an acquisition kernel, acquisition filter, or integration window is used to extract a value of the luminance of each pixel of the display panel 220. In some embodiments, a deblurring, sharpening, or deconvolution algorithm is used to extract a value of the luminance of each pixel of the display panel 220. In some embodiments, this is done separately for each channel R, G, B, etc. In some embodiments the acquisition kernel is centered on the expected known location of each pixel being measured, and uses either an unweighted or weighted integral of a size and shape taking into account the PSF of the particular area of the pixel and the spacing in the captured image between the activated pixels of the test pattern. In some embodiments in which the defocusing and spacing of the pixels causes images of the pixels to partially overlap, the acquisition kernel is weighted so as to ignore the areas of overlap, or is otherwise configured and processed so that areas of overlap do not introduce errors in the determination of the luminance of each pixel. In some embodiments the acquisition kernel is generally rectangular and in other embodiments it is generally circular. Other acquisition kernals are possible, and in general they are sized, shaped, and weighted in accordance with the PSF and the spacing in the captured image of the activated pixels of the test pattern.

The luminances L1 and L2 for every pixel of the display panel 220 when driven respectively at P1 and P2 are determined. These correspond to the luminance measurements of the pixels 110 of the display panel 220 which displayed the regular test pixels of the display test patterns. Further luminances L1a, L1b, L2a, and L2b for the sparse subset of the pixels of the display panel 220 when driven respectively by P1+Δ, P1−Δ, P2+Δ, and P2−Δ are also determined. These correspond to the luminance measurements of the pixels 110 display panel 220 which displayed the multilevel test pixels of the display test patterns. For every pixel of the display, scale factors S1 and S2 associated respectively with DAC signal P1 and P2 may be determined from measured luminances L1a, L1b, L2a, and L2b when available for that pixel, or are interpolated from scale factors S1 and S2 of other pixels of the display for which measured luminances L1a, L1b, L2a, and L2b are available or are calculated from L1a, L1b, L2a, and L2b values interpolated from L1a, L1b, L2a, and L2b of other pixels of the display for which those measurements exist. In embodiments where the multilevel pixels about P1 are not at the same locations as the multilevel pixels about P2, spatial interpolation of the luminances L1a, L1b, L2a, and L2b at pixels which have the values can be used to determine a luminance L1a, L1b, L2a, and L2b for the pixel in question, in order to determine the scale factors.

In one embodiment, S1 is determined from measured luminances L1, L1a, and L1b and Δ as:

$$S1 = \frac{1}{2}\left(\frac{\Delta}{L1a - L1} + \frac{\Delta}{L1 - L1b}\right) \quad (1)$$

and S2 is determined from measured luminances L2, L2a, and L2b and Δ as:

$$S2 = \frac{1}{2}\left(\frac{\Delta}{L2a - L2} + \frac{\Delta}{L2 - L2b}\right) \quad (2)$$

Analogous scale factors may be determined similarly for embodiments having regular test pixels which include pixels at N levels, P1, . . . , PN, and the multilevel test pixels include pixels at 2N levels, namely, at P1+Δ, P1−Δ, . . . , PN+Δ, PN−Δ. In some embodiments, processing is performed separately for each channel R, G, B, etc. Higher order approximations may be obtained for embodiments with more than two multilevel samples about each point PX, e.g. for four multilevel pixels P1+Δ, P1−Δ, P1+δ, P1−δ.

As can be seen from equations (1) and (2), the scale factors S1 and S2 quantify the relationship, respectively at DAC points P1 and P2, between a change in DAC signal value and the resulting change in luminance.

The measured luminance L1 at P1 is compared to a known expected luminance to determine an actual deviation in luminance. The actual deviation in luminance and the scale factor S1 are used to determine a corrected DAC signal CP1, i.e. the corrected signal which causes the pixel to produce the desired actual luminance for greyscale luminance value P1. Similarly a corrected DAC signal CP2 is calculated for correcting greyscale luminance value P2. From these two points (P1, CP1) and (P2, CP2) a linear relationship of the form CPn=B*Pn+C is determined and hence for any desired greyscale luminance value Pn, a corrected DAC value CPn may be calculated.

The correction data for each pixel therefore includes the slope B and offset C, as determined above using L1, L2, S1, and S2, to determine the corrected DAC value CPn from any input greyscale luminance value Pn.

The correction data, once determined 310 is transferred 312 to the display 250 via the controller 202 and stored in memory 106.

During operation of the display 250, correction data stored in memory 106 is used by the controller 202 or in combination with a separate compensation block (not shown) to correct image data input to the display 250 for display on the display panel 220. In some embodiments, the slope B and offset C are calculated for each pixel of the display panel 220, using for example interpolation, prior to being stored in the display 250, to reduce processing required of the display 250 while correcting DAC signals. For embodiments having regular test pixels which include pixels at N levels (where N>2), and multilevel test pixels at 2N levels, the correction data includes higher order coefficients of (N−1)th order polynomials directly analogous to the linear relationship described above. In some embodiments, the correction data include slope B and offset C (or analogous higher order coefficients) for each channel, R, G, B, etc.

When the pixels 110 of the display panel 220 are driven by the corrected signals, the image displayed by the display panel 220 exhibits greatly reduced or negligible non-uniformity.

As described herein above, the calibration patterns along with the display test patterns should include the calibration pixels, the regular test pixels, and the multilevel pixels, while ensuring that in each pattern the pixels are spaced far enough apart so images of these activated pixels in the captured images have at least some portion which does not overlap with blurred images of other pixels. In some embodiment these pixels are displayed separately for each of the channels R, G, B, etc. The ordering and grouping of the pixels in the display test patterns does not matter. In some embodiments, each display test pattern only has pixels of the same channel, in other embodiments only of the same level (e.g. P1 or P2), while in other embodiments each display test pattern includes pixels of more than one or of all channels, and in other embodiments each test pattern includes pixels of both levels. As described above each pixel of the display panel 220 should be driven at the two levels P1, P2 (or more in the case of P1, . . . PN) and a subset of pixels should be driven as multilevel pixels to provide data for the scale factors S1, S2 (or possibly S1, . . . , SN). Although the ordering and grouping of the pixels in the test patterns does not matter, ideally the spacing is minimized to minimize the total number of display test patterns displayed. This reduces the capture time of the process.

Figure 4:
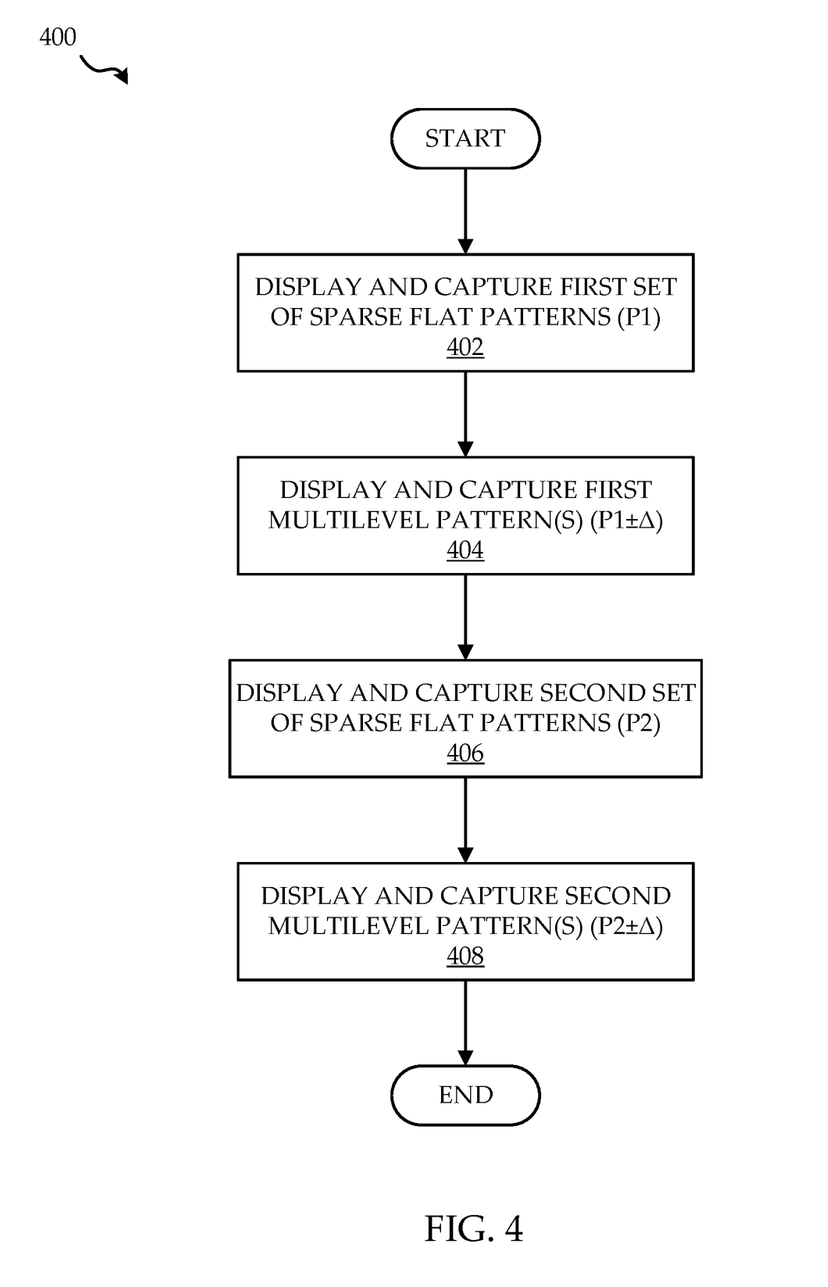
FIG. 4 illustrates an example method of displaying and capturing display test patterns of the method illustrated in FIG. 3.

In some embodiments, the pixels of the display test patterns displayed and captured 308 are grouped into specific types of display test patterns. FIG. 4 illustrates a specific method 400 of displaying and capturing 308 display test patterns in which the regular test pixels and multilevel pixels have been grouped in specific ways. In some embodiment, all of the following is performed separately for each channel of the display R, G, B, etc.

At 402 a first set of sparse flat test patterns are displayed, each pattern of the set such that all of the activated pixels of the pattern are at level P1. The number of display test patterns in the first set of sparse flat patterns depends upon the spacing of pixels in the array which avoids or produces the expected amount of overlap. For example, if each flat test pattern has activated pixels in a square rectilinear array or rectangular lattice spaced apart vertically and horizontally by three inactive pixels, then the first set of sparse flat patterns would include a total of 16 test patterns, each shifted vertically and or horizontally with respect to each other. The first set of sparse test patterns, ensures the regular test pixel at level P1 is measured for every pixel of the display panel 220.

At 404 a first set of one or more multilevel patterns is displayed, each pattern of the set such that all of the activated pixels of the pattern are at level P1 plus or minus a small Δ. The desired number of pixels (equivalently the density of pixels) for the subset constituting the multilevel pixels about P1 will vary depending upon the exhibited amount of nonuniformity in the scale factor for the type of particular display panel 220 being measured. The number of display test patterns in the first set of one or more multilevel patterns depends upon the spacing of pixels in the array which avoids or produces the expected amount of overlap, and the desired number of pixels (or the desired pixel density) in the subset constituting the multilevel pixels about P1. In embodiments where the scale factor exhibited across the display panel 220 is generally uniform, only one multilevel pattern for P1 may be required. The first set of one or more multilevel patterns (P1±Δ), ensures all desired multilevel pixels for the display panel 220 about level P1 are measured.

At 406 a second set of sparse flat test patterns are displayed, each pattern of the set such that all of the activated pixels of the pattern are at level P2. The number of display test patterns in the second set of sparse flat patterns depends upon the spacing of pixels in the array which avoids or produces the expected amount of overlap. For example, if each flat test pattern has activated pixels in a square rectilinear array or rectangular lattice spaced vertically and horizontally by three pixels, then the second set of sparse flat patterns would include a total of 16 test patterns, each shifted vertically and or horizontally with respect to each other. The second set of sparse test patterns, ensures the regular test pixel at level P2 is measured for every pixel of the display panel 220.

At 408 a second set of one or more multilevel patterns is displayed, each pattern of the set such that all of the activated pixels of the pattern are at level P2 plus or minus a small Δ. The number of display test patterns in the second set of one or more multilevel patterns depends upon the spacing of pixels in the array which avoids or produces the expected amount of overlap, and the desired number of pixels (or desired pixel density) in the subset constituting the multilevel pixels about P2. Generally this number of pixels (or pixel density) will be the same as that for the number of pixels in the subset constituting the multilevel pixels about P1, and for the same reasons. In embodiments where the scale factor exhibited across the display panel 220 is generally uniform, only one multilevel pattern for P2 may be required. The second set of one or more multilevel patterns (P2±Δ), ensures all desired multilevel pixels for the display panel 220 about level P2 are measured.

While particular implementations and applications of the present disclosure have been illustrated and described, it is to be understood that the present disclosure is not limited to the precise construction and compositions disclosed herein and that various modifications, changes, and variations can be apparent from the foregoing descriptions without departing from the spirit and scope of an invention as defined in the appended claims.

What is claimed is:

1. An optical correction method for correcting for non-uniformity of an emissive display panel having pixels, each pixel having a light-emitting device, the method comprising:
   arranging a camera in front of the display panel;
   activating a plurality of pixels of the display panel to display:
      a first greyscale luminance value of a relatively low greyscale luminance value;
      a second greyscale luminance value of a relatively high greyscale luminance value which is spaced apart from the first greyscale luminance value by a relatively large greyscale luminance value difference;
      a third greyscale luminance value greater or less than the first greyscale luminance value by a first relatively small greyscale luminance value difference, the relatively large greyscale luminance value difference being greater than said first relatively small greyscale luminance value difference; and
      a fourth greyscale luminance value greater or less than the second greyscale luminance value by a second relatively small greyscale luminance value difference, the relatively large greyscale luminance value difference being greater than said second relatively small greyscale luminance value difference,
   wherein each activated pixel displays at least one of the first, second, third, and fourth greyscale luminance values, and wherein, for at least one subset of the activated pixels, each pixel displays at least two of the first, second, third, and fourth greyscale luminance values;

measuring a luminance of each activated pixel with the camera while displaying the first, second, third, and fourth greyscale luminance values, to generate luminance measurement data including respectively first, second, third, and fourth luminance measurement data; and determining correction data from said first, second, third, and fourth luminance measurement data for correcting non-uniformity of images displayed in the display panel.

2. The optical correction method of claim 1 wherein said determining correction data comprises comparing the first and third luminance measurement data and comparing the second and fourth luminance measurement data.

3. The optical correction method of claim 1, wherein correction data is determined for each pixel of the display panel with use of the first and second luminance measurement data of activated pixels local to the pixel, and with use of the third and fourth luminance measurement data of activated pixels throughout the display panel.

4. The optical correction method of claim 1, wherein the relatively low greyscale luminance value is substantially 10 percent of a maximum greyscale luminance value, and the relatively high greyscale luminance value is substantially 80 percent of the maximum greyscale luminance value.

5. The optical correction method of claim 1, wherein the relatively small greyscale luminance value is one of substantially one percent of a maximum greyscale luminance value and the smallest incremental digital value of possible greyscale luminance values.

6. The optical correction method of claim 1, further comprising correcting image data with use of the correction data prior to driving the pixels to display an image corresponding to the image data.

7. The optical correction method of claim 1 wherein activating the plurality of pixels comprises displaying one or more sparse sets of activated pixels.

8. The optical correction method of claim 7 wherein the one or more sparse sets of activated pixels are displayed one set at a time.

9. The optical correction method of claim 7, wherein each of the first, second, third, and fourth greyscale luminance values are different from a greyscale luminance of a flat background greyscale displayed between said activated pixels of each sparse set.

10. The optical correction method of claim 7, wherein the activated pixels comprise calibration pixels, the method further comprising:

determining locations of the calibration pixels as they appear in images captured by the camera.

11. The optical correction method of claim 7, wherein displaying said one or more sparse sets of activated pixels comprises displaying one or more test patterns and wherein said measuring the luminance of each activated pixel comprises capturing images of the display with the camera, the method further comprising:

defocusing the camera such that the focal point of the camera lies outside of a plane passing through the light-emitting devices of the display panel, the defocusing such that individual pixels of the display panel are blurred in images of the display panel captured by the camera and such that aliasing is avoided in the captured images;

wherein locations of said activated pixels are spaced apart in each sparse set such that in each captured image, at least one portion of each blurred image of each activated pixel does not overlap with a blurred image of another activated pixel, wherein a resolution of the camera is less than twice a resolution of the display panel, and wherein each of the luminance measurements of each of the activated pixels is performed with use of an acquisition kernel having at least one of its size, shape, and weighting in accordance with a spacing of the activated pixels in each sparse set.

12. An optical correction system for correcting non-uniformity of an emissive display having pixels, each pixel having a light-emitting device, the system comprising:

a camera arranged in front of the display for capturing images of the display while a plurality of pixels of the display is activated to display:

a first greyscale luminance value of a relatively low greyscale luminance value, and a second greyscale luminance value of a relatively high greyscale luminance value which is spaced apart from the first greyscale luminance value by a relatively large greyscale luminance value difference;

a third greyscale luminance value greater or less than the first greyscale luminance value by a first relatively small greyscale luminance value difference, the relatively large greyscale value difference being greater than said first relatively small greyscale luminance value difference; and a fourth greyscale luminance value greater or less than the second greyscale luminance value by a second relatively small greyscale luminance value difference, the relatively large greyscale luminance value difference being greater than said second relatively small greyscale luminance value difference;

wherein each activated pixel displays at least one of the first, second, third, and fourth greyscale luminance values, and wherein, for at least one subset of the activated pixels, each activated pixel displays at least two of the first, second, third, and fourth greyscale luminance values; and optical correction processing coupled to the camera and for:

receiving from the camera captured images of each activated pixel while displaying the first, second, third, and the fourth greyscale luminance values, to generate luminance measurement data including respectively first, second, third, and fourth luminance measurement data;

determining correction data from said first, second, third, and fourth luminance measurement data for correcting non-uniformity of images displayed in the display; and transmitting the correction data to the display for storage in a memory of the display.

13. The optical correction system of claim 12, wherein said determining correction data comprises comparing the first and third luminance measurement data and comparing the second and fourth luminance measurement data.

14. The optical correction system of claim 12, wherein the optical correction processing is further for determining correction data for each pixel of the display with use of the first and second luminance measurement data of activated pixels local to the pixel, and with use of the third and fourth luminance measurement data of activated pixels throughout the display.

15. The optical correction system of claim 12, wherein the relatively low greyscale luminance value is substantially 10 percent of a maximum greyscale luminance value, and the relatively high greyscale luminance value is substantially 80 percent of the maximum greyscale luminance value.

16. The optical correction system of claim 12, wherein the relatively small greyscale luminance value is one of substantially one percent of a maximum greyscale luminance value and the smallest incremental digital value of possible greyscale luminance values.

17. The optical correction system of claim 12, further comprising:
a controller of the emissive display coupled to said optical correction processing, said controller for:
receiving image data for display by the display;
receiving from the optical correction processing the correction data; and
correcting the image data with use of the correction data prior to driving the pixels to display an image corresponding to the image data.

18. The optical correction system of claim 12 wherein the plurality of pixels of the display are activated to display one or more sparse sets of activated pixels.

19. The optical correction system of claim 18 wherein the one or more sparse sets of activated pixels are displayed one set at a time.

20. The optical correction system of claim 19, wherein said activated pixels comprise calibration pixels, and wherein the optical correction processing is further for:
determining locations of the calibration pixels as they appear in the images captured by the camera.

21. The optical correction system of claim 18, wherein each of the first, second, third, and fourth greyscale luminance values are different from a greyscale luminance of a flat background greyscale displayed between said activated pixels of each sparse set.

22. The optical correction system of claim 18, wherein displaying said one or more sparse sets of activated pixels comprises displaying one or more test patterns, wherein the camera is defocused such that the focal point of the camera lies outside of a plane passing through the light-emitting devices of the display and such that individual pixels of the display are blurred in images of the display captured by the camera and such that aliasing is avoided in the captured images, wherein locations of said activated pixels are spaced apart in each sparse set such that in each captured image, at least one portion of each blurred image of each activated pixel does not overlap with a blurred image of another activated pixel, wherein a resolution of the camera is less than twice a resolution of the display, and wherein generating measurement data associated with each of the activated pixels is performed by the optical correction processing with use of an acquisition kernel having at least one of its size, shape, and weighting in accordance with a spacing of the activated pixels in each sparse set.

* * * * *